(12) United States Patent
Ballard et al.

(10) Patent No.: US 11,271,235 B2
(45) Date of Patent: Mar. 8, 2022

(54) SOLID OXIDE FUEL CELL UNIT

(71) Applicant: Ceres Intellectual Property Company Limited, Horsham (GB)

(72) Inventors: Andrew Ballard, Horsham (GB); Tomasz Domanski, Horsham (GB); Jon Harman, Horsham (GB); Alan Robertson, Horsham (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 4 days.

(21) Appl. No.: 16/638,459

(22) PCT Filed: Aug. 13, 2018

(86) PCT No.: PCT/GB2018/052296
§ 371 (c)(1),
(2) Date: Feb. 11, 2020

(87) PCT Pub. No.: WO2019/034856
PCT Pub. Date: Feb. 21, 2019

(65) Prior Publication Data
US 2020/0365923 A1     Nov. 19, 2020

(30) Foreign Application Priority Data
Aug. 16, 2017 (GB) .................................... 1713141

(51) Int. Cl.
*H01M 8/1097* (2016.01)
*H01M 8/2404* (2016.01)
(Continued)

(52) U.S. Cl.
CPC ....... *H01M 8/1097* (2013.01); *H01M 8/0232* (2013.01); *H01M 8/0258* (2013.01);
(Continued)

(58) Field of Classification Search
CPC ............ H01M 8/1286; H01M 8/2404; H01M 8/2432; H01M 8/2483
See application file for complete search history.

(56) References Cited

U.S. PATENT DOCUMENTS 10,270,119 B2    4/2019 Leah et al.
2003/0203272 A1  10/2003 Kelly et al.
(Continued)

FOREIGN PATENT DOCUMENTS

CN    105074982 A    11/2015
EP    1 439 592 A2    7/2004
(Continued)

OTHER PUBLICATIONS

International Preliminary Report on Patentability for International Patent Application No. PCT/GB2018/052296, dated Feb. 27, 2020.
(Continued)

*Primary Examiner* — Olatunji A Godo
(74) *Attorney, Agent, or Firm* — SGPatents PLLC

(57) ABSTRACT

The present invention relates to an improved metal supported solid oxide fuel cell unit, fuel cell stacks, fuel cell stack assemblies, and methods of manufacture.

14 Claims, 17 Drawing Sheets

(51) Int. Cl.
  *H01M 8/2418* (2016.01)
  *H01M 8/2483* (2016.01)
  *H01M 8/0232* (2016.01)
  *H01M 8/0258* (2016.01)
  *H01M 8/0271* (2016.01)

(52) U.S. Cl.
  CPC ....... *H01M 8/0271* (2013.01); *H01M 8/2404* (2016.02); *H01M 8/2418* (2016.02); *H01M 8/2483* (2016.02)

(56) References Cited

U.S. PATENT DOCUMENTS

| | | | |
|---|---|---|---|
| 2003/0215693 | A1 | 11/2003 | Asai et al. |
| 2004/0265667 | A1 | 12/2004 | Kato et al. |
| 2005/0153188 | A1* | 7/2005 | Schenk ............... H01M 8/0206 429/442 |
| 2016/0380298 | A1 | 12/2016 | Leah et al. |

FOREIGN PATENT DOCUMENTS

| | | |
|---|---|---|
| EP | 1 889 650 A1 | 2/2008 |
| EP | 2 859 606 A1 | 8/2016 |
| GB | 2 400 723 A | 10/2004 |
| KR | 2013-0075992 A | 7/2013 |
| RU | 2262160 C2 | 10/2005 |
| RU | 2496186 C1 | 10/2013 |
| RU | 2610141 C2 | 2/2017 |
| WO | WO 2005/034277 A1 | 4/2005 |
| WO | WO 2007/021280 A1 | 2/2007 |
| WO | WO 2007/085863 A1 | 8/2007 |
| WO | WO 2008/132493 A2 | 11/2008 |
| WO | WO 2012/040253 A1 | 3/2012 |
| WO | WO 2013/186222 A1 | 12/2013 |

OTHER PUBLICATIONS

International Search Report for International Patent Application No. PCT/GB2018/052296, dated Jan. 31, 2019.
International Preliminary Report on Patentability for International Patent Application No. PCT/GB2018/052295, dated Feb. 27, 2020.
International Search Report for International Patent Application No. PCT/GB2018/052295, dated Oct. 25, 2018.
Search Report for GB Patent Application No. 1813194.6, dated Jan. 10, 2019.
Search Report for GB Patent Application No. 1813195.3, dated Jan. 11, 2019.
U.S. Appl. No. 16/638,458, filed Feb. 11, 2020.
Non-Final Office Action dated Apr. 29, 2021, in U.S. Appl. No. 16/638,458.
Search Report from Russian Patent Application No. 2020110704, dated Nov. 29, 2021.
Office Action from Taiwan Patent Application No. 107128196, dated Nov. 24, 2021.
Search Report from Taiwan Patent Application No. 107128196, dated Nov. 24, 2021.

* cited by examiner

SOLID OXIDE FUEL CELL UNIT

SCOPE OF THE INVENTION

The present invention relates to an improved metal supported solid oxide fuel cell unit, fuel cell stacks, fuel cell stack assemblies, and methods of manufacture.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO2/35628, WO3/07582, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, WO2010/061190, WO2015/004419, WO2015/136295, WO2016/124929, WO2016/124928, WO2016/128721 and WO2016/083780. All publications referenced herein and their references are incorporated herein by reference in their entirety. Definition of terms used herein can be found as necessary in the above publications.

Fuel cell stacks, fuel cell stack assemblies, fuel cell units (including fuel cell stack layers), and the arrangement of fuel cells within a fuel cell stack unit and fuel cell stack layer are well known.

The present invention seeks to improve upon the prior art. The present invention seeks to improve fuel distribution and fuel flow within individual fuel cell units (fuel cell stack layers). In particular, it seeks to do one or more of: improve fuel velocity within fuel cell units, reduce fuel residence time, improve fuel distribution, and reduce the fuel pressure drop across fuel cell units.

SUMMARY OF THE INVENTION

According to a first aspect of the present invention, there is provided a metal supported solid oxide fuel cell unit comprising:
a) a metal substrate defining first and second opposed surfaces, wherein at least one solid oxide fuel cell is disposed on said second surface of said metal substrate;
b) a metal spacer, which defines first and second opposed surfaces, said metal spacer comprising:
 (i) an external perimeter,
 (ii) an at least one fuel inlet internal perimeter defining a fuel inlet port,
 (iii) at least one cut-out internal perimeter defining a cut-out, and
 (iv) at least one fuel outlet internal perimeter defining a fuel outlet port,
wherein said first surface of said metal substrate is attached to said second surface of said metal spacer; and
c) a metal interconnect plate which defines first and second opposed surfaces, said second surface of said metal interconnect plate sealingly attached to said first surface of said metal spacer,
wherein:
a fuel inlet port volume is defined between said first surface of said metal substrate, each at least one fuel inlet internal perimeter of said metal spacer, and said second surface of said metal interconnect plate,
a cut-out volume is defined between said first surface of said metal substrate, said at least one cut-out internal perimeter of said metal spacer, and said second surface of said metal interconnect plate, and
a fuel outlet port volume is defined between said first surface of said metal substrate, each at least one fuel outlet internal perimeter of said metal spacer, and said second surface of said metal interconnect plate,
wherein said metal interconnect plate comprises a plurality of bridge portions defining a fluid flow path from said at least one fuel inlet port volume to said at least one cut-out volume to said at least one fuel outlet port volume.

Thus, in embodiments comprising a plurality of fuel inlet internal perimeters defining fuel inlet ports, there are a plurality of fuel inlet port volumes.

Thus, in embodiments comprising a plurality of cut-out internal perimeters defining cut-outs, there are a plurality of cut-out volumes.

Thus, in embodiments comprising a plurality of outlet port internal perimeters defining fuel outlet ports, there are a plurality of fuel outlet port volumes.

Thus, each fuel inlet port, each cut-out, and each fuel outlet port defined in the metal spacer are separate from one another, i.e. are divided from one another. Thus, the internal perimeters define dividers in the metal spacer between one another. They can also be described as being partitioned from one another, and discontinuous. Preferably, a fluid flow passage is not defined in the metal substrate between any of the fuel inlet ports, the cut-outs, and the fuel outlet ports.

Preferably, the metal spacer is generally flat, i.e. is generally planar. Preferably, the metal substrate is generally flat, i.e. is generally planar.

The bridge portions act to define a fluid flow bridge or channel (i.e. a fluid flow path) between adjacent volumes, e.g. (a) between fuel inlet port volumes and adjacent cut-out volumes, (b) between adjacent cut-out volumes, and (c) between cut-out volumes and fuel outlet port volumes. Thus, a fluid flow path is defined from the at least one fuel inlet port to the at least one cut-out to the at least one fuel outlet port via the bridge portions.

Preferably there are a plurality of bridge portions between adjacent volumes. Preferably there are at least three bridge portions, more preferably at least four, between adjacent volumes, more particularly between adjacent volumes in the direction fuel inlet port to fuel outlet port. Preferably there are a plurality of bridge portions between a fuel inlet port volume and a cut-out volume, more preferably between each. Preferably, there are a plurality of bridge portions between a cut-out volume and a fuel outlet port volume, more preferably between each. Preferably there are a plurality of bridge portion between adjacent cut-out volumes, more preferably between each. More preferably, there are a plurality of bridge portions between adjacent cut-outs in a path from a fuel inlet port volume to a fuel outlet port volume, more particularly between adjacent cut-outs in the direction fuel inlet port to fuel outlet port, or in a direct or shortest path.

The provision of bridge portions in the metal interconnect plate together with fuel inlet internal perimeters in the metal spacer allows the provision of complex fuel inlet and outlet ports which can provide for managed fluid flow distribution from the at least one fuel inlet port to the at least one cut-out, and from the at least one cut-out to the at least one fuel outlet port. This can e.g. allow for a more even distribution of fuel within the fuel cell unit, and thus help optimise fuel cell unit operation.

Preferably, the bridge portions extend outwardly from the first surface of the metal interconnect plate, away from the second surface of the metal interconnect plate. More preferably, the bridge portions comprise a protrusion from the first surface of the metal interconnect plate. More preferably, the bridge portions comprise an indent in the second surface of the metal interconnect plate and a corresponding protrusion from the first surface of the metal interconnect plate. More preferably, the bridge portions comprise a dimple. More preferably, the bridge portions comprise an elongate dimple. Thus, the bridge portions may for example have a lozenge shape. Other shapes will be readily apparent to one of ordinary skill in the art.

Preferably, the bridge portions define a volume between the first surface of the metal spacer and the second surface of the metal interconnect plate.

Preferably, the metal interconnect plate comprises at least one fuel inlet bridge portion defining a fluid flow channel between a fuel inlet port volume and a cut-out volume, and at least one fuel outlet bridge portion defining a fluid flow channel between a cut-out volume and a fuel outlet port volume. In embodiments comprising a plurality of cut-outs, preferably the metal interconnect plate comprises at least one cut-out bridge portion defining a fluid flow channel between adjacent cut-outs.

Preferably, the metal spacer comprises at least two fuel inlet internal perimeters defining at least two fuel inlet ports. Preferably, the metal spacer comprises at least two cut-out internal perimeters defining at least two cut-outs. Preferably, the metal spacer comprises at least two fuel outlet internal perimeters defining at least two fuel outlet ports.

Preferably, each metal spacer fuel port (each fuel inlet port and each fuel outlet port) comprises a fuel duct region, a plurality of fuel throat regions, and a corresponding plurality of fuel distributor channel regions (i.e. each fuel throat region leading to a fuel distributor channel region). Preferably, the fuel duct regions of the metal spacer fuel ports are aligned with the fuel ports of the metal substrate and the metal interconnect plate.

The provision of the plurality of fuel throat regions and fuel distributor channel regions also reduces the risk of fuel starvation due to blockage.

Preferably, there is at least one bridge portion between each fuel distributor channel region and the adjacent cut-out.

CFD (computational flow dynamics) analysis shows that (compare e.g. FIGS. 16B (prior art) and 16C (present invention)), the fuel velocity within the fuel cell unit (particularly, across the at least one cut-out volume) remains more constant in the present design as compared to prior art products, with less fuel deficiency regions at the corner of the fuel cell, and the fuel promoted in a more uniform manner across said cell, which improve the chemical reaction which occurs within the fuel cell.

CFD analysis also shows that the normalised fuel residence time is decreased as compared to prior art devices (compare e.g. FIGS. 17A (prior art) and 17B (present invention)). This means that a lower concentration of Hydrogen is required for the chemical reaction at the fuel cell. That is to say, less fuel is required for the chemical reaction to occur at the fuel cell, and therefore the present invention is more efficient than prior art devices.

CFD analysis also shows improved flow distribution across the active region of the fuel cell as compared to prior art devices. CFD analysis also shows that the pressure drop between inlet and outlet ports is less (i.e. is improved) with the present invention as compared to prior art devices. Minimizing the pressure drop across the cell is beneficial to maintain the compression along the stack.

The plurality of fuel throats are dimensioned to restrict (i.e. control) fluid flow from the fuel duct region. Preferably, each fuel distributor channel region is wider than (i.e. has a larger cross-section than) its corresponding fuel throat. Preferably, the fuel throat defines a fluid flow axis, and the width (cross-section) of the fuel throat perpendicular to the fluid flow axis is less than the width (cross-section) of the corresponding fuel distributor channel perpendicular to the fluid flow axis.

Preferably, each fuel throat region has a constant width "W" between the fuel duct region and the corresponding fuel distributor channel region. In use, this allows fuel to be transferred at high speed (i.e. high velocity) from the fuel duct region to the corresponding fuel distributor channel region, and this reduces the risk of fuel starvation.

In certain embodiments, all fuel throat regions have the same width.

Preferably, each fuel distributor channel region has a width which increases from the fuel distributor channel proximal (closest to) the fuel throat region to the end of the fuel distributor channel proximal the adjacent cut-out internal perimeter. Preferably, each fuel distributor channel region has a curved shape being the width of said fuel distributor channel region. More preferably, this increases, starting from the width "W" of the fuel throat region and finishing at a width equal to a distance ($d_a$, $d_b$, $d_c$), being ($d_a < d_b < d_c$).

Preferably, each cut-out internal perimeter (and each cut-out defined by it) has a plurality of corner regions. Fuel flow to corner regions of fuel cells is known to be difficult—it is highly desirable to optimise fuel flow to those corner regions. Preferably, with metal spacer fuel port comprising a plurality of fuel throats and corresponding fuel distributor channel regions, the fuel distributor channel region closest to (i.e. adjacent, or proximal) a corner region (or corner) has a final width (a width at the point closest to or proximal the adjacent cut-out internal perimeter) less than that of the other fuel distributor channel regions. More preferably, with a plurality of fuel distributor channel regions arranged in the order:

fuel distributor channel region closest to a corner region (i.e. corner) to fuel distributor channel region furthest from the corner region (i.e. corner), each fuel distributor channel region has a final width greater than that of the preceding fuel distributor channel region.

Preferably, the width (or distance) d at the edge of the fuel distributor channel region adjacent the adjacent cut-out internal perimeter is greater than (i.e. longer) in the areas close to the centre of the cell to promote the fuel uniformly along the middle region of the cell, improving upon the fuel distribution of previous designs wherein there were problems of fuel deficiency in said central region.

Preferably, each fuel throat region has a length ("L"). More preferably, in fuel cell stacks and fuel cell stack assemblies of the present invention (below), the fuel throat region 44b is related to the size of the compression gaskets located in between the interconnect of one solid oxide fuel cell unit and the substrate layer of the following solid oxide fuel cell unit. More preferably, the gaskets comprise a toroid shape surrounding a port of interconnect. The length "L" of the fuel throat region is preferably coincident with (corresponds with, is related to) the external radius minus the internal radius of the compression gasket. Such arrangements may assist in reducing or minimising pressure drop.

Preferably, the fuel used in the products of the present invention is a hydrocarbon fuel. Suitable hydrocarbon fuels include desulfurize hydrocarbon fuel, reformate or reformate mixed with an anode off-gas (i.e. an anode-side exhaust gas from a fuel outlet side of a fuel cell unit). Similarly, the fuel used can be start up or shut down gases from a fuel cell unit, more particularly start up or shut down anode off-gas (i.e. an anode-side exhaust gas from a fuel outlet side of a fuel cell unit).

The terms "disposed on" and "attached to" are used interchangeably herein.

Preferably, the metal supported solid oxide fuel cell unit is a fuel cell stack layer, more preferably a metal supported solid oxide fuel cell stack layer. Thus, a plurality of fuel cell units may be assembled to form a solid oxide fuel cell stack.

Preferably, the metal substrate (or in embodiments where the metal spacer comprises at least one metal spacer plate), each metal substrate plate (also referred to as a "fuel cell plate") comprises at least one porous region. Preferably, the at least one porous region is surrounded by a non-porous region. More preferably, each metal substrate or each metal substrate plate comprises one porous region. More preferably, each porous region is surrounded by a non-porous region. More preferably, the or each porous region is a perforated region. Preferably, it comprises (i.e. is defined by) a plurality of perforations extending from the first surface to the second surface (i.e. between the first surface and the second surface). More preferably, the perforations are laser drilled perforations. Preferably, the at least one non-porous region of the metal spacer or each metal substrate plate is attached to the metal spacer. Preferably, each at least one cut-out internal perimeter is wholly overlapped by said metal substrate.

Preferably, the at least one porous region is coincident with (i.e. extends to, or overlaps) the corresponding cut-out internal perimeter of the metal substrate, i.e. extends to the bound of the cut-out internal perimeter. This is particularly preferable in embodiments where the metal substrate plate comprises a single porous region.

Preferably, each solid oxide fuel cell disposed on a metal substrate plate comprises an anode layer deposited over (bonded to) a porous region of the metal substrate plate, an electrolyte layer deposited over (bonded to) the anode layer, and a cathode layer deposited over the electrolyte layer. Preferably, the electrolyte layer extends over the anode to sealingly attach to the non-perforated region of the metal substrate plate surrounding the anode.

In certain embodiments, the metal substrate is provided as a single component. In other embodiments, the metal substrate is provided as a plurality of discrete components.

In certain embodiments, the metal substrate comprises at least one metal substrate plate (more preferably, at least two metal substrate plates) and at least two blanking plates, each metal substrate plate defining first and second opposed surfaces and each blanking plate defining first and second opposed surfaces, wherein at least one solid oxide fuel cell is disposed on said second surface of each metal substrate plate, and wherein said first surface of each metal substrate plate and said first surface of each blanking plate is attached to said second surface of said metal spacer, each at least one cut-out internal perimeter of said metal spacer being wholly overlapped by a metal substrate plate.

Thus, the plurality of metal substrate plates attached to the metal spacer together define a metal substrate (also referred to as a "substrate layer" or "metal substrate layer") attached to the metal spacer. Thus, each fuel cell unit comprises a metal substrate, a metal spacer, and a metal interconnect plate.

The metal substrate plates are preferably disposed between and on the same plane as the blanking plates. The blanking plates are preferably of a generally rectangular shape. Preferably, each blanking plate comprises at least one internal perimeter defining a fuel port, i.e. defining at least one fuel port. More preferably, each blanking plate defines two fuel ports.

Preferably, the metal substrate plates and the blanking plates do not contact one another, i.e. do not abut one another. Thus, preferably a blanking plate (such as a first blanking plate) does not abut or contact an adjacent metal substrate plate (such as a first metal substrate plate). Thus, preferably adjacent metal substrate plates do not abut or contact one another. Thus, preferably a second blanking plate does not abut or contact an adjacent second metal substrate plate.

By having the blanking plates and metal substrate plates attached to the metal spacer, and not having them abutting or contacting one another, this allows for a "tolerance gap" to be defined between them, and allows for variability in the positioning of the components during the manufacturing process. This provides a significant technical advantage in terms of the manufacturing process and can e.g. assist in an increased manufacturing process speed, reduced cost, increased reliability of the fuel cell unit, and/or increased lifespan of the fuel cell unit.

Preferably, the blanking plates are metal blanking plates. More preferably, the blanking plates are made of the same metal as the metal substrate plates. Preferably, the blanking plates are of equal thickness to the metal substrate plates.

Preferably, the metal spacer comprises at least two internal perimeters each defining a fuel port. More preferably, each metal spacer defines two fuel ports at a first end (preferably, a fuel inlet end, i.e. defines at least two fuel inlet ports), and two fuel ports at a second end (preferably, an exhaust fuel outlet end, i.e. defines at least two fuel outlet ports). The cut-out internal perimeters defining the cut-outs may be considered a first set of internal perimeters, and the internal perimeters defining the fuel ports may be considered a second set of internal perimeters.

Each metal substrate plate is attached wholly overlapping a cut-out internal perimeter i.e. on and over a cut-out. Thus, each metal substrate plate covers a cut-out. Each metal substrate plate is attached to the metal spacer between an at least one internal perimeter defining a cut-out and the external perimeter of the metal spacer.

Preferably, the metal substrate is attached (or the at least two blanking plates and the at least one metal substrate plate) are attached to the metal spacer by welding, more preferably by line welding.

Preferably, each metal substrate plate is attached to the metal spacer between an at least one cut-out internal perimeter defining a cut-out and the external perimeter of the metal spacer. More preferably, each metal substrate plate is attached to the metal spacer between a cut-out internal perimeter defining a cut-out and the external perimeter of the metal spacer.

Preferably, the metal interconnect plate is sealing attached to the metal spacer by welding.

Preferably, the metal interconnect plate is sealingly attached to the metal spacer along a line disposed between (a) the external perimeter of the metal spacer, and (b) the at least one cut-out internal perimeter of the metal spacer. Preferably, the line is proximal the external perimeter of the metal spacer. More preferably, the line is adjacent the external perimeter of the metal spacer. More preferably, the line is within 10 mm, more preferably within 5 mm, more preferably within 4 mm, more preferably within 3 mm, more preferably within 2 mm of the external perimeter of the metal spacer.

More preferably, the weld(s) attaching the metal substrate (or the at least two blanking plates and the at least one metal substrate plate) to the metal spacer, and the weld sealingly attaching the metal interconnect plate to the metal spacer do not overlap.

Preferably, the first surface of each metal substrate plate and the first surface of each blanking plate is disposed on and attached to the second surface of the metal spacer.

Preferably, the second surface of the metal interconnect plate is disposed on and sealingly attached to the first surface of the metal spacer.

Preferably, there are a total of two blanking plates.

Preferably, the metal interconnect plate comprises a plurality of dimples extending outwardly from the first surface, away from the second surface. Preferably, the metal interconnect plate comprises a plurality of dimples extending outwardly from the first surface, away from the second surface, and a plurality of dimples extending away from the first surface, outwardly from the second surface. Preferably, the dimples alternate. Thus, preferably, the dimples alternate between extending away from the first surface and from the second surface of the metal interconnect plate.

Preferably, the fuel cell unit comprises at least one combined metal substrate plate, each combined metal substrate plate comprising a (combined) blanking plate and at least one metal substrate plate. Thus, a base plate and at least one metal substrate plate are attached to one another to form a single component (a combined metal substrate plate), or are integrally formed as a single component from the outset, prior to the combined metal substrate plate being attached to the metal spacer. More preferably, the fuel cell unit comprises two combined metal substrate plates. More preferably, the fuel cell unit comprises a combined metal substrate plate, at least one metal substrate plate, and a blanking plate. Alternatively, the fuel cell unit comprises two combined metal substrate plates, and at least one metal substrate plate.

In embodiments comprising at least one combined metal substrate plate, a combined metal substrate plate preferably does not abut or contact an adjacent metal substrate plate or combined metal substrate plate.

As well as providing metal substrate plates in a 2×1 series (linear) arrangement between the blanking plates, other arrangements and numbers of metal substrate plates can be provided. For example, metal substrate plates may be provided in a 1×2 (parallel) arrangement between the blanking plates. Alternatively, metal substrate plates may be provided in a 2×2, 3×2 or 4×2 arrangement and the same blanking plates may be used with the various arrangements. Similarly, fuel cell units may be provided with metal substrate plates in 2×3, 3×3 or 4×3 arrangements using the same blanking plates. Other arrangements will be readily apparent.

The use of the plurality of metal substrate plates allows the metal substrate plates to be combined in a modular manner to obtain a range of fuel cell unit sizes and a range of power outputs as desired, including e.g. a larger fuel cell unit size and therefore larger power output. The attachment of the metal substrate plates to the metal spacer can also reduce the likelihood of bending of the fuel cells within the fuel cell unit, therefore decreasing the risk of reduced electrical conductivity and reduced gas sealing that may occur should the fuel cell bend. The use of metal substrate plates also means that a given metal substrate plate can be manufactured and used in a number of different fuel cell unit products. Thus, for example, it could be used in a fuel cell unit which contains just two metal substrate plates. Alternatively, it could be used in a larger fuel cell unit, such as one having 4, 6, 8, 9, 10 or 12 metal substrate plates. This can act to reduce the cost and increase the speed, quality and reliability of manufacture of the metal substrate plate (and its at least one fuel cell).

In various embodiments, two blanking plates are provided, arranged (when attached to the metal spacer) with one at either end of the metal substrate, i.e. one at a first end of the metal substrate, and the other at a second end of the metal substrate. In other embodiments, blanking plates may be split into first and second portions i.e. a first blanking plate portion and a second blanking plate portion. Thus a first blanking plate can comprise a first blanking plate portion and a second blanking plate portion. Similarly, a second blanking plate can comprise a first blanking plate portion and a second blanking plate portion, each blanking plate portion attached to the metal spacer.

The fuel cell unit has internal fuel manifolding. When a plurality of the fuel cell units are assembled into a stack an open manifolded oxidant (air) flow passage is defined between (a) the first surface of the metal interconnect plate of a first fuel cell unit, and (b) the second surfaces of the metal substrate (or the at least two blanking plates and the at least one metal substrate plate) of an adjacent second fuel cell unit. Preferably, the metal interconnect plate comprises a plurality of dimples extending outwardly from the first surface, away from the second surface. Preferably, the dimples of a first fuel cell unit abut the cathode layer of the at least one solid oxide fuel cell of an adjacent second fuel cell unit and act as a current collector.

The above optional and preferable features are equally applicable to other aspects of the present invention detailed below.

Also provided according to the present invention is a solid oxide fuel cell stack comprising a plurality of metal supported solid oxide fuel cell units according to the present invention.

Preferably, the solid oxide fuel cell units are separated from one another by compression gaskets.

Also provided according to the present invention is a solid oxide fuel cell stack assembly comprising: a base plate, an end plate, a solid oxide fuel cell stack according to the present invention positioned between the base plate and the end plate, and a skirt attached to the base plate and the end plate and defining a volume between the skirt, the base plate and the end plate within which is contained the fuel cell stack.

Also provided according to the present invention is a method of assembly of a metal supported solid oxide fuel cell unit, the metal supported solid oxide fuel cell unit comprising:
   a) a metal substrate defining first and second opposed surfaces, wherein at least one solid oxide fuel cell is disposed on said second surface of said metal substrate;
   b) a metal spacer, which defines first and second opposed surfaces, said metal spacer comprising:
      (i) an external perimeter,
      (ii) an at least one fuel inlet internal perimeter defining a fuel inlet port,
      (iii) at least one cut-out internal perimeter defining a cut-out, and
      (iv) at least one fuel outlet internal perimeter defining a fuel outlet port; and c) a metal interconnect plate which defines first and second opposed surfaces, said method of assembly comprising the steps of:
  (i) attaching said first surface of said metal substrate to said second surface of said metal spacer; and
  (ii) sealingly attaching said second surface of said metal interconnect to said first surface of said metal spacer
  wherein:
    a fuel inlet port volume is defined between said first surface of said metal substrate, each at least one fuel inlet internal perimeter of said metal spacer, and said second surface of said metal interconnect plate,
    a cut-out volume is defined between said first surface of said metal substrate, each at least one cut-out internal perimeter of said metal spacer, and said second surface of said metal interconnect plate, and
    a fuel outlet port volume is defined between said first surface of said metal substrate, each at least one fuel outlet internal perimeter of said metal spacer, and said second surface of said metal interconnect plate,
  wherein said metal interconnect plate comprises a plurality of bridge portions defining a fluid flow path from said at least one fuel inlet port volume to said at least one cut-out volume to said at least one fuel outlet port volume.

In embodiments where the metal substrate comprises at least two blanking plates and at least one metal substrate plate (preferably, a plurality of metal substrate plates), preferably, step (i) comprises clamping the metal spacer to the at least two blanking plates and the at least one metal substrate plate and attaching the metal spacer to the at least two blanking plates and the at least one metal substrate plate.

Preferably, step (ii) comprises clamping the metal interconnect plate to the metal spacer and attaching the metal interconnect plate to the metal spacer.

Preferably, at least one of step (i) and step (ii) comprises attaching by welding. More preferably, both steps (i) and (ii) comprise attaching by welding.

Preferably, the at least one metal substrate plate and the plurality of blanking plates is aligned with the metal spacer and aligned with the metal interconnect plate.

Preferably, locating means (also referred to as positioning means) are used to locate the various components during the assembly process. Suitable location means include datum edges, fixed dowels, and spring dowels. Other location means will be readily apparent to one of ordinary skill in the art.

Preferably, the solid oxide fuel cell unit is assembled by attaching the metal substrate (or the at least one metal substrate plate and blanking plates) to the metal spacer so that the metal substrate (or the at least one metal substrate plate) is attached over the at least one cut out in the metal spacer. The metal substrate (or the at least two blanking plates and at least one metal substrate plate) and the metal spacer are preferably clamped together using a first clamping plate. Preferably, the metal substrate (or the at least two blanking plates and the at least one metal substrate plate) are positioned on a base plate, and the metal spacer plate is positioned on top. Preferably, a first clamping plate is positioned over the metal spacer. More preferably, clamping means clamps the metal substrate (or the at least two blanking plates and the at least one metal substrate plate) and the metal spacer between the base plate and the first clamping plate. More preferably, the first clamping plate defines welding slots through which the metal substrate (or the at least two blanking plates and the at least one metal substrate plate) is/are welded to the metal spacer.

Preferably, the metal interconnect plate is attached to the metal spacer by welding. Preferably, the metal interconnect plate is placed over the metal spacer to which the metal substrate has already been attached (or the at least one metal substrate plate and blanking plates have already been attached). Preferably, a second clamping plate is positioned over the metal interconnect plate. More preferably, clamping means clamps the metal substrate (or the at least two blanking plates and at least one metal substrate plate), the metal spacer, and the metal interconnect plate between the base plate and the second clamping plate. Preferably, the second clamping means defines an opening. More preferably, the metal interconnect plate is welded to the metal substrate through the opening. Preferably, the welding is between the external perimeters of the metal substrate and the metal interconnect plate, and the internal perimeters of the metal spacer. More preferably, the welding extends through the metal interconnect plate, metal substrate, and through to the metal substrate (or the at least two blanking plates and the at least one metal substrate plate).

The at least two blanking plates and the at least one metal substrate plate attached to the metal spacer together define a metal substrate.

Preferably, the metal substrate (or the at least two blanking plates, the at least one metal substrate plate), the metal spacer, and the metal interconnect plate are aligned during assembly by means of a datum edge.

An enabling disclosure of the present invention, to one of ordinary skill in the art, is provided herein. Reference now will be made in detail to embodiments of the invention, one or more examples of which are set forth below. Each example is provided by way of explanation of the invention, not limitation of the invention.

Figure 6:
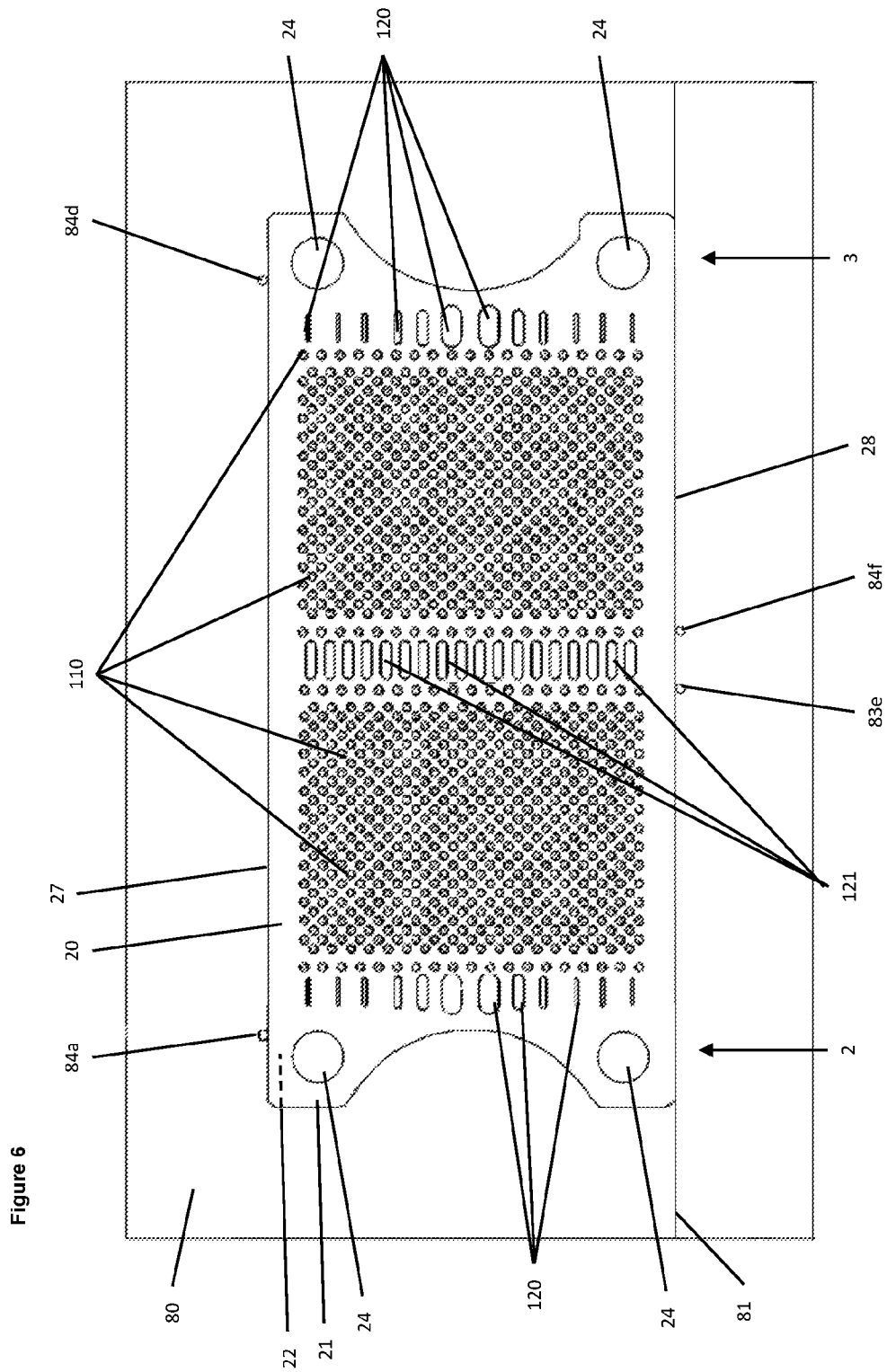
FIG. 6 shows a top view of a metal interconnect plate positioned on top of the metal spacer of FIG. 5
Figure 7:
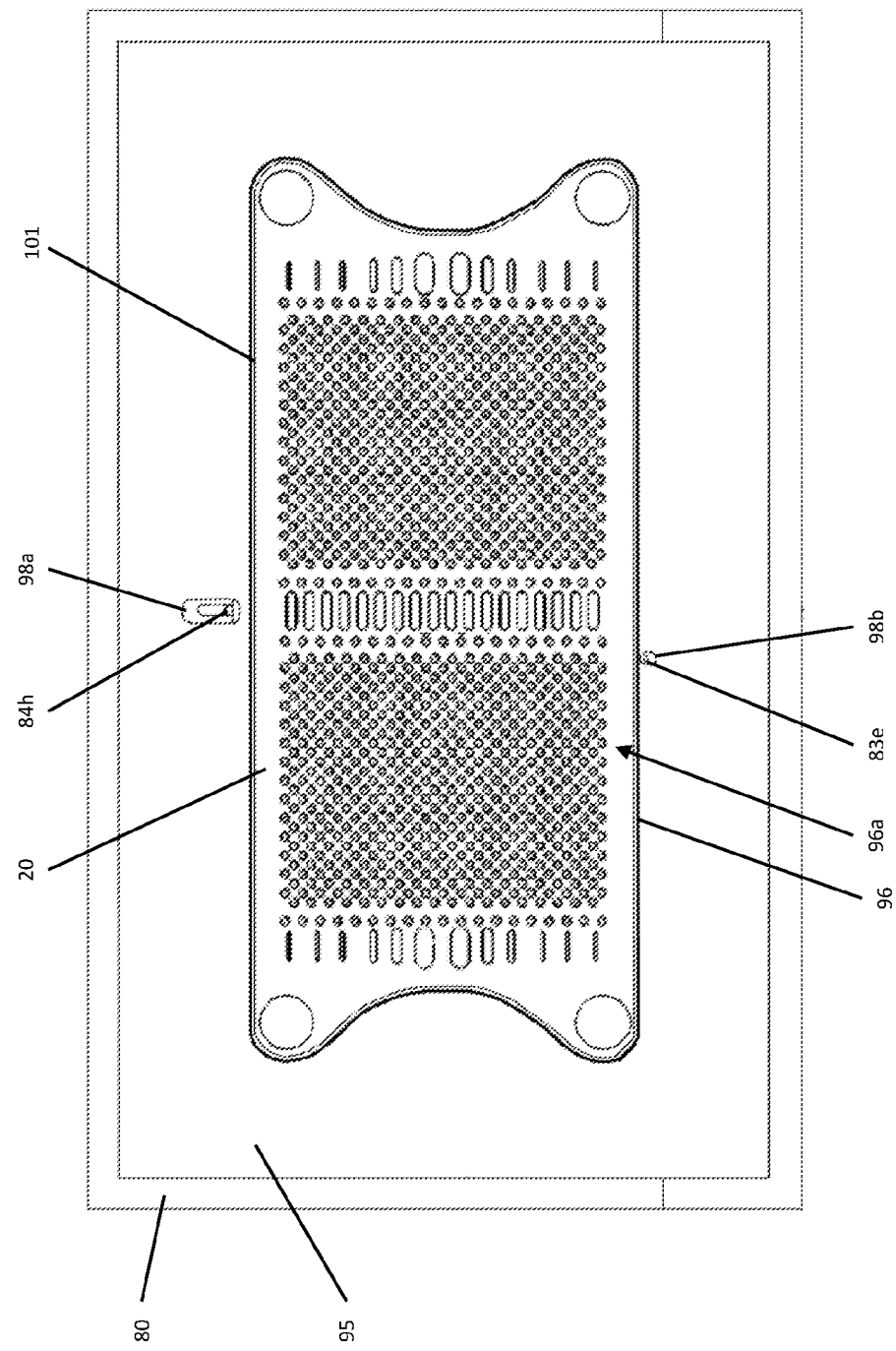
Figure 8:
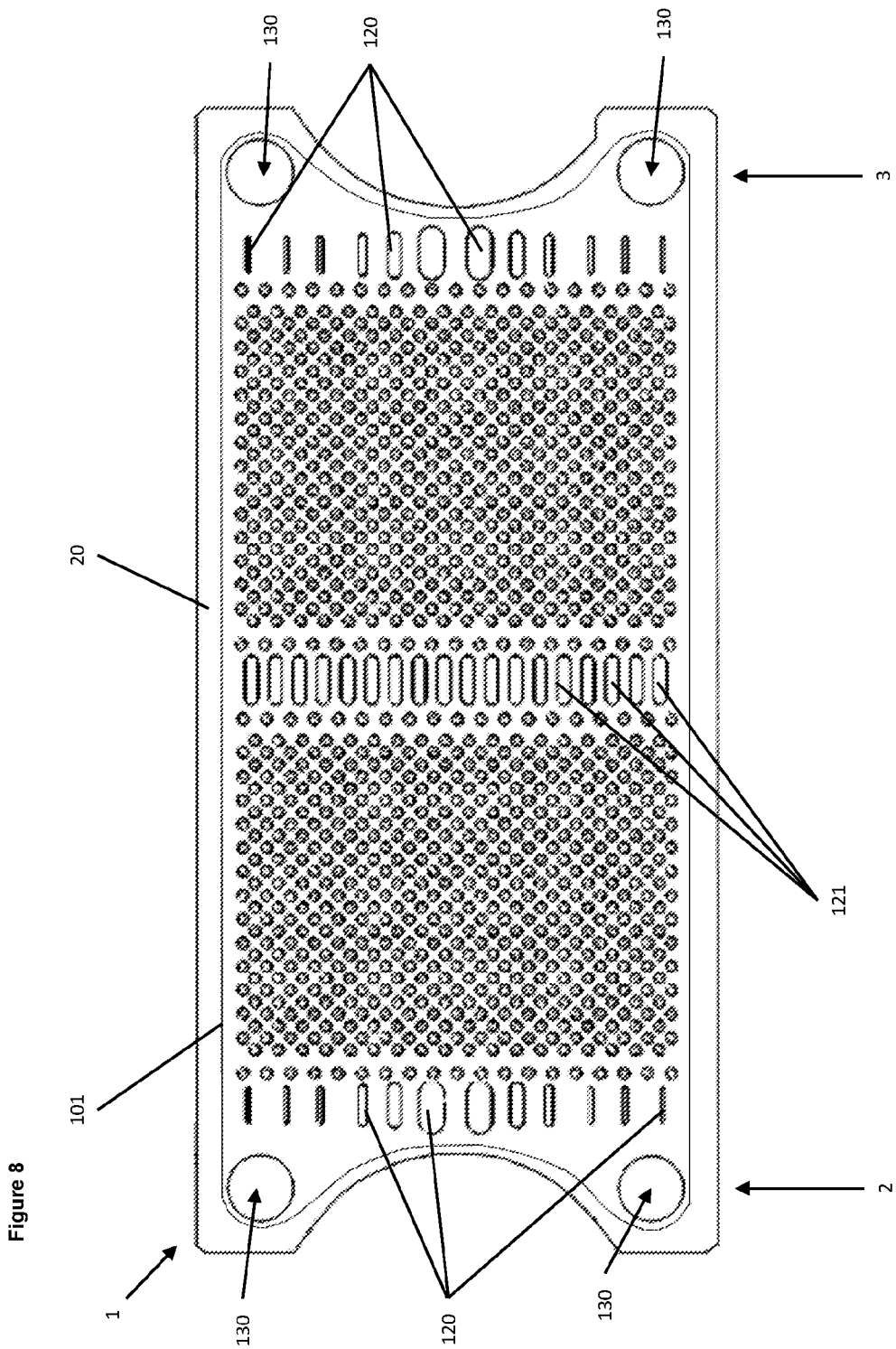
Figure 9:
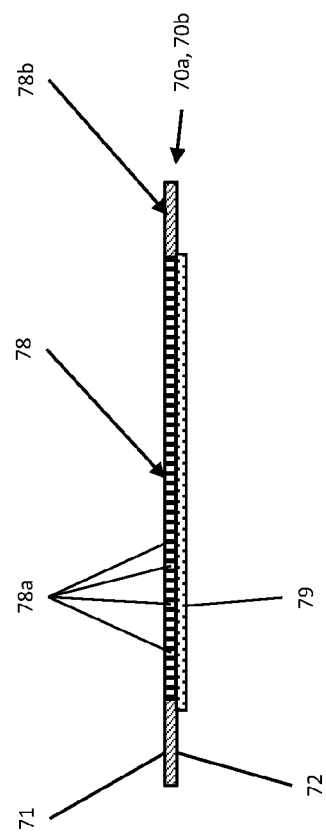
Figure 10:
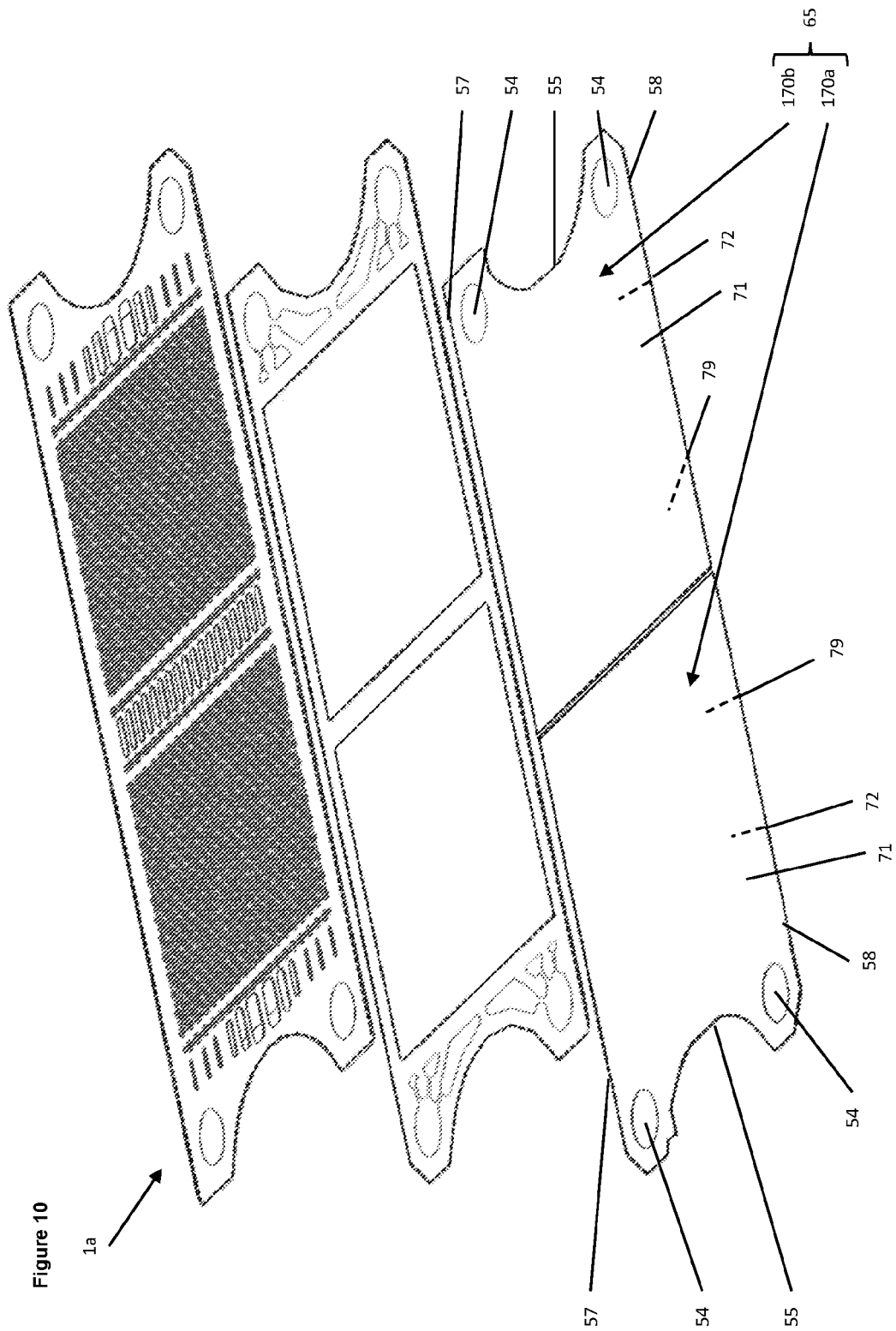

FIG. 7 shows a top view of a second clamping plate positioned on top of the metal interconnect plate of FIG. 6 for welding purposes FIG. 8 shows a top view of the metal interconnect plate of FIG. 6 after welding and removal of the second clamping means and removal from the assembly base plate FIG. 9 shows a cross-section through a metal substrate plate FIG. 10 shows an exploded perspective view of the fuel cell unit of Embodiment 2

Figure 11:
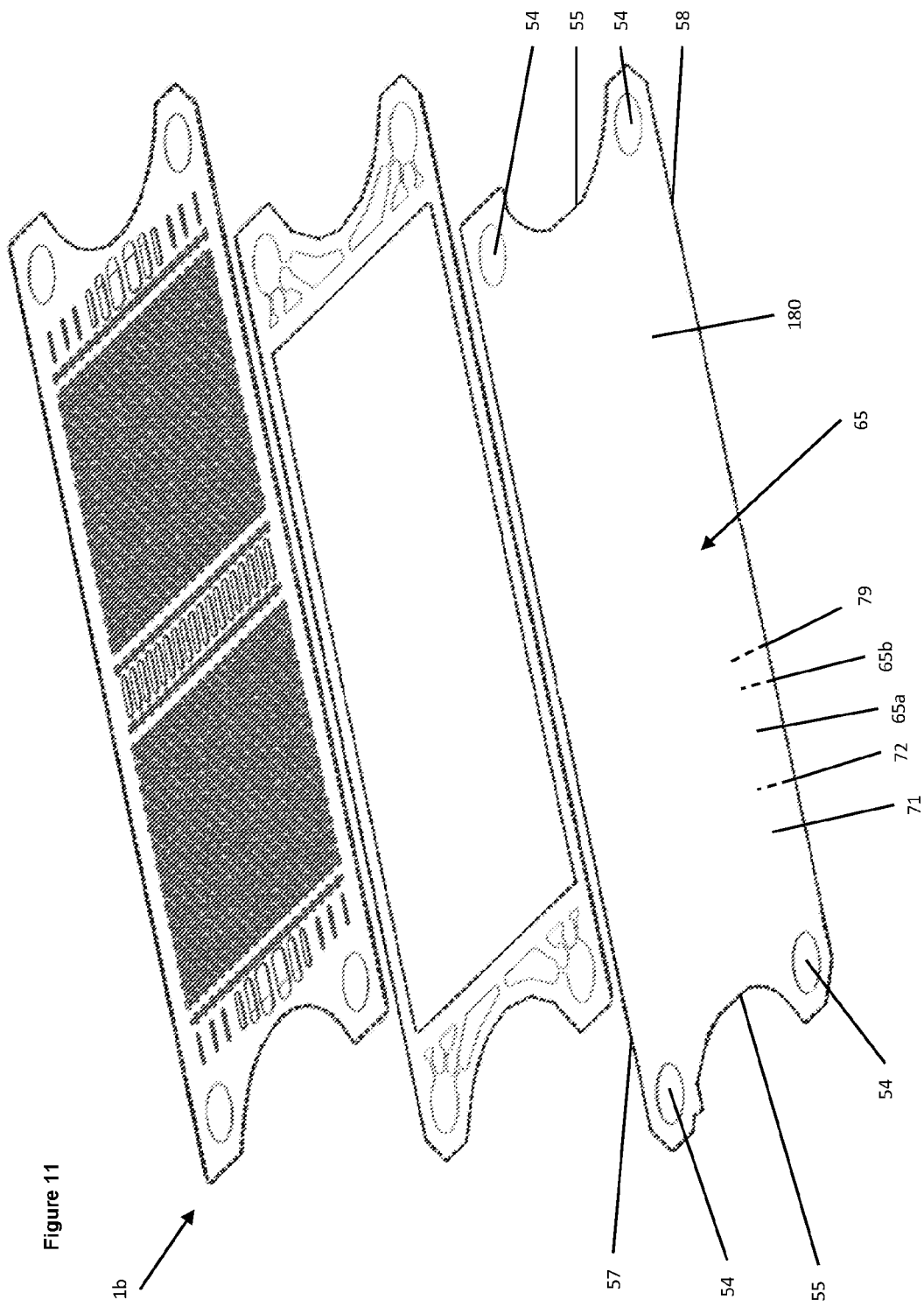

FIG. 11 shows an exploded perspective view of the fuel cell unit of Embodiment 4

Figure 12:
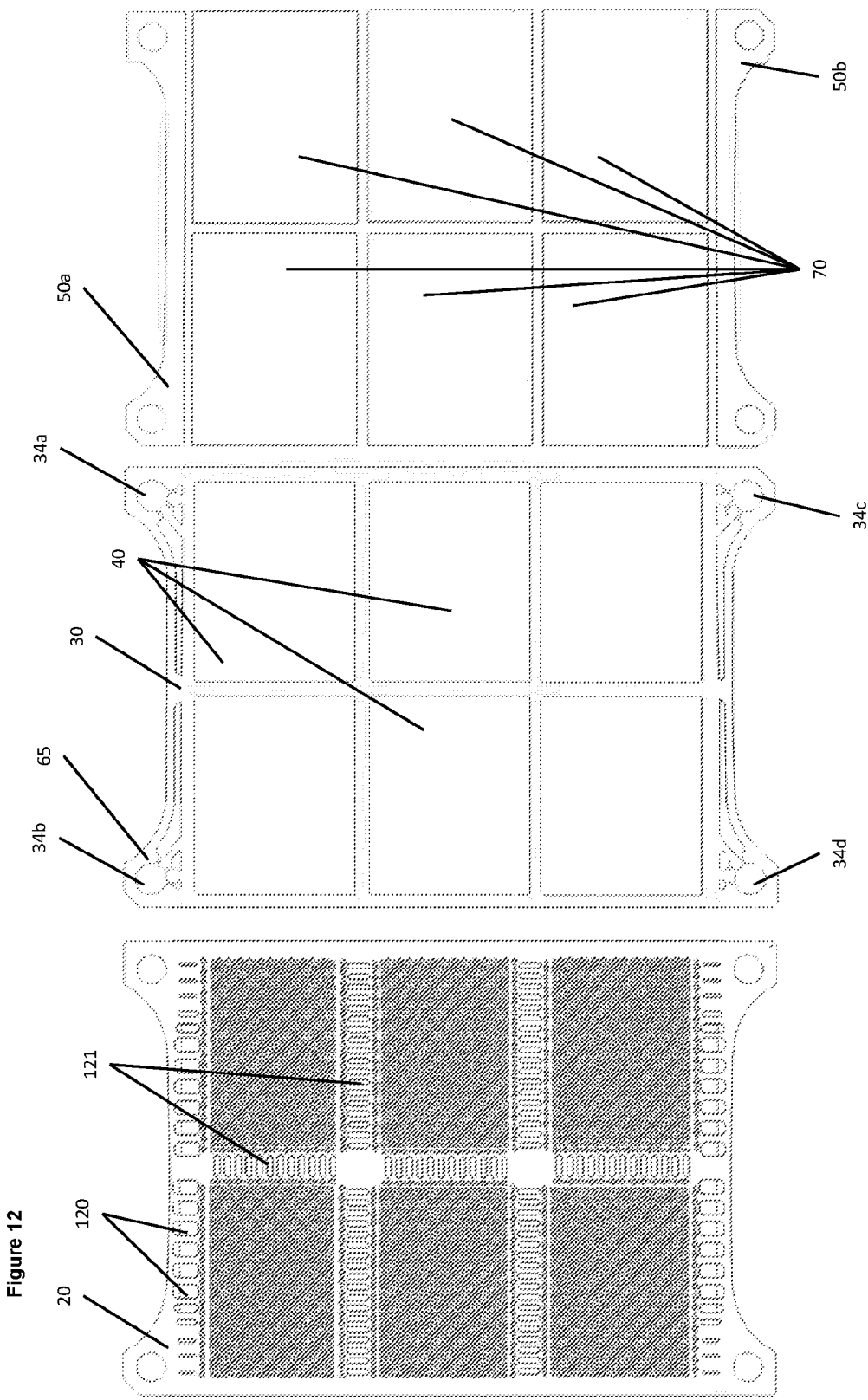

FIG. 12 shows a top view of the component parts of the fuel cell unit of the fuel cell unit of Embodiment 5

Figure 13:
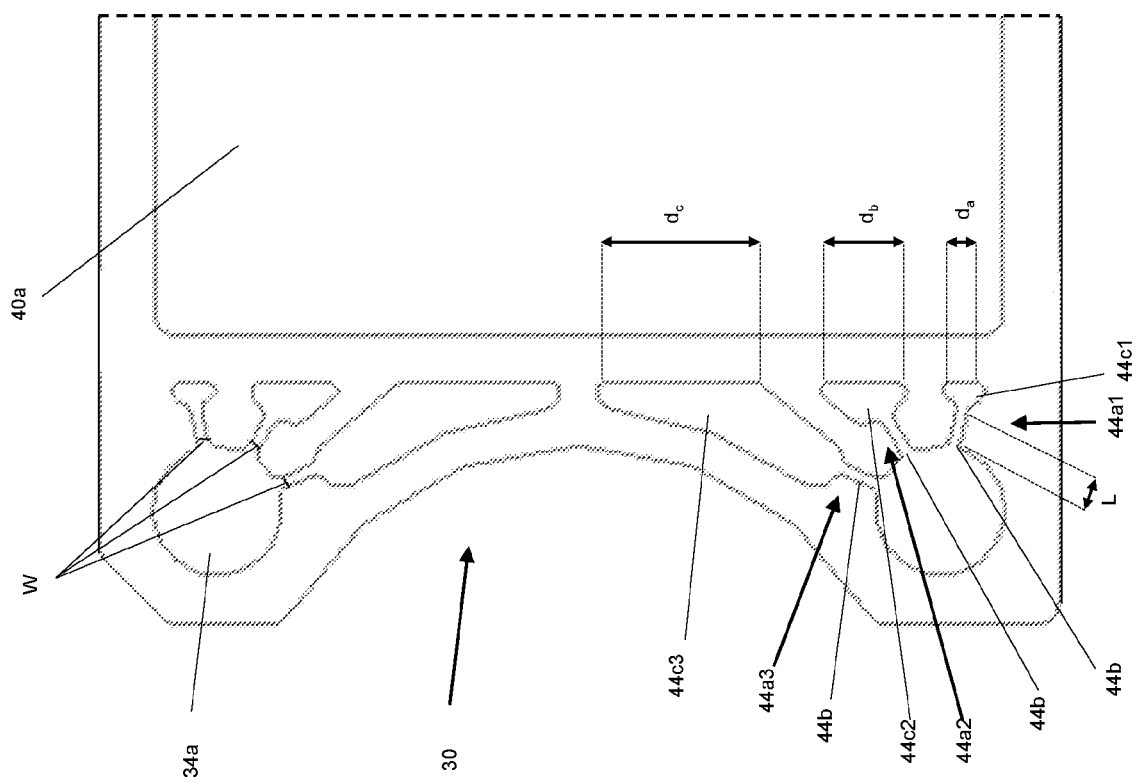

FIG. 13 shows a top view of a part of a metal spacer

Figure 14:
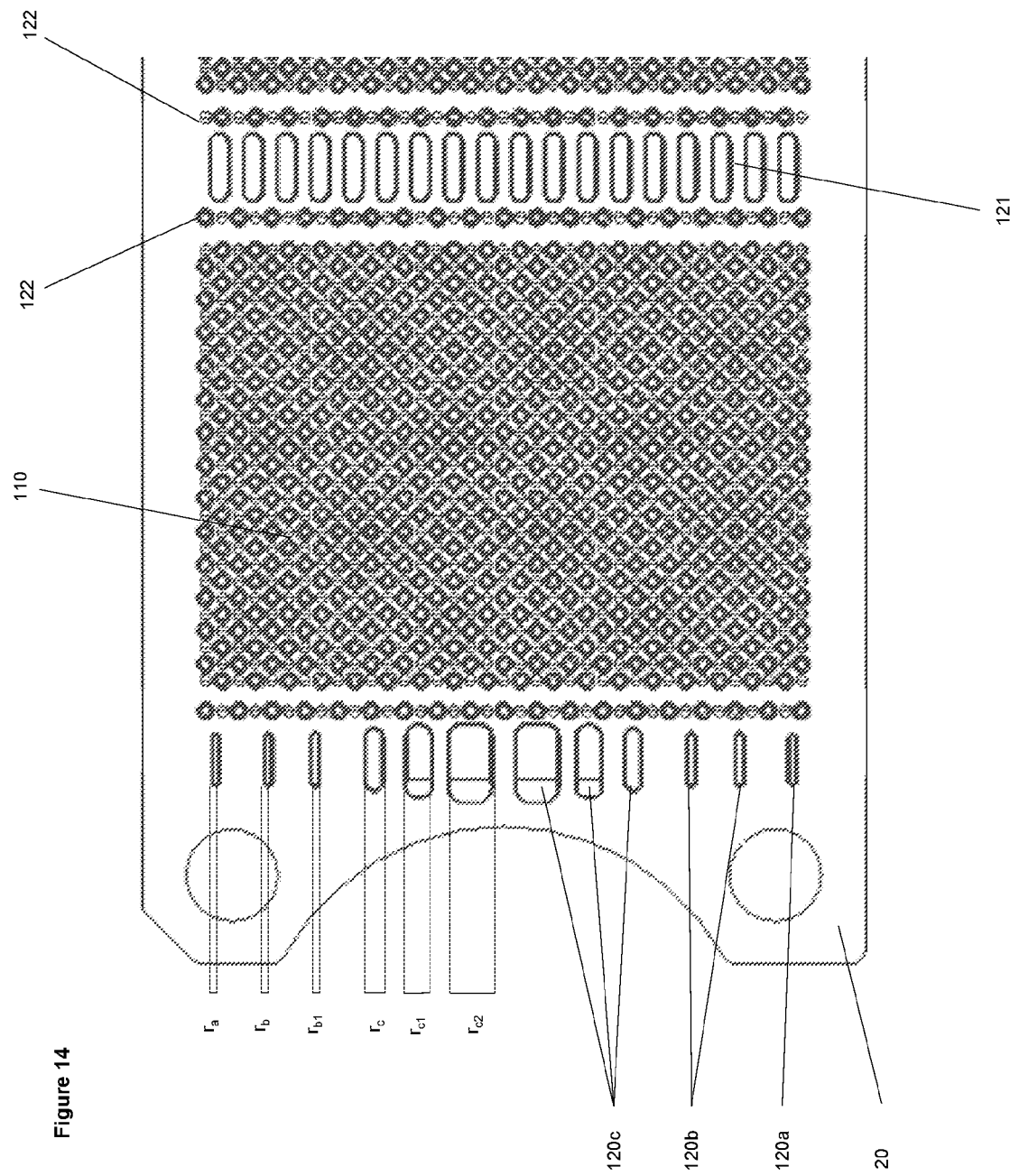

FIG. 14 shows a top view of a part of a metal interconnect plate

Figure 15:
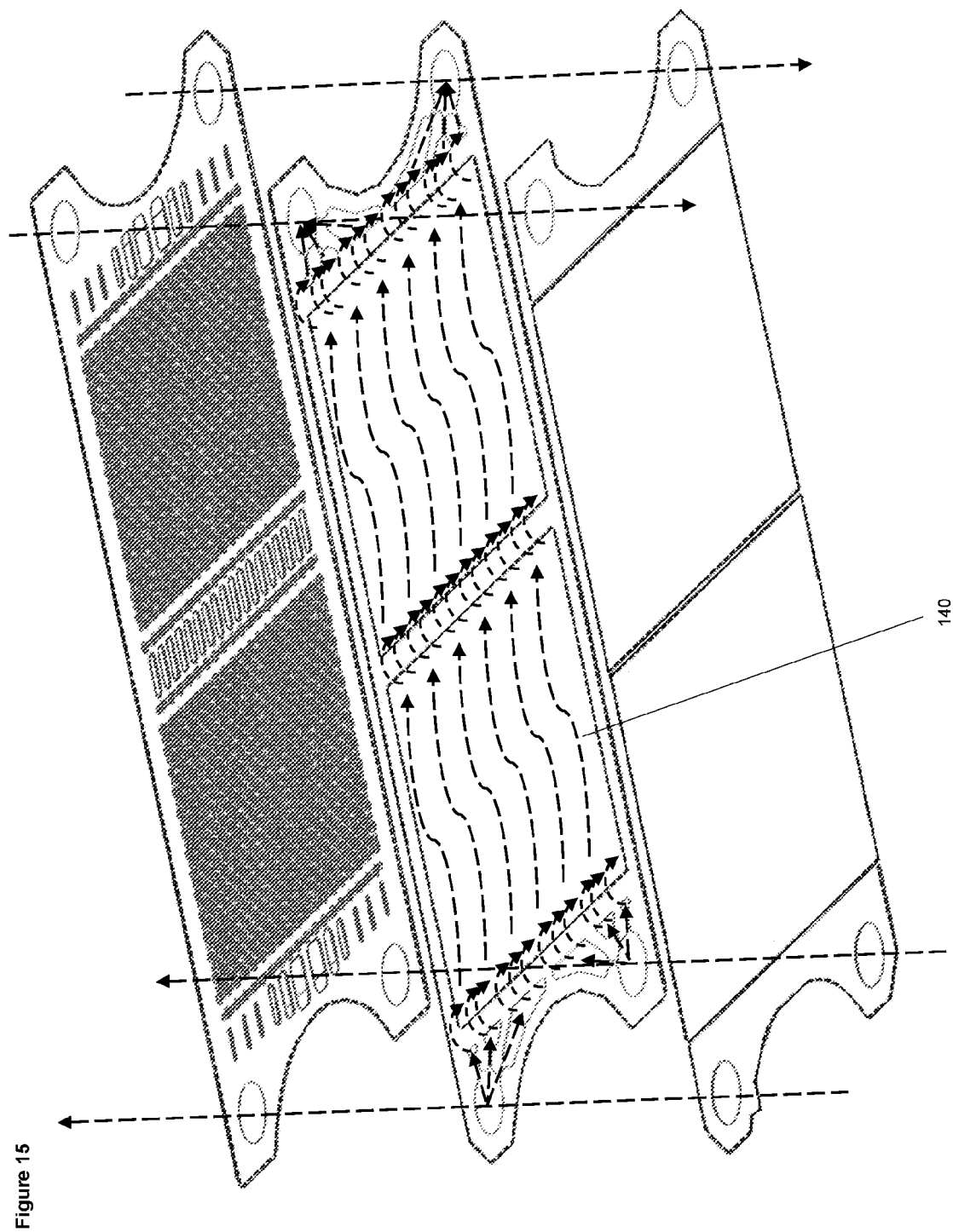
Figure 16A:
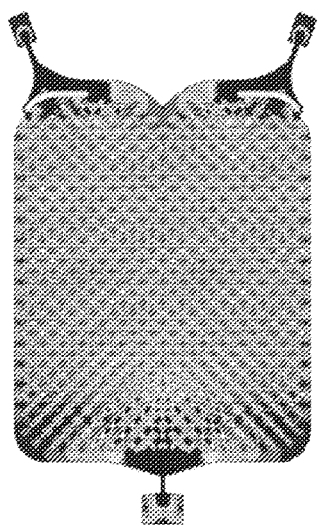
Figure 16B:
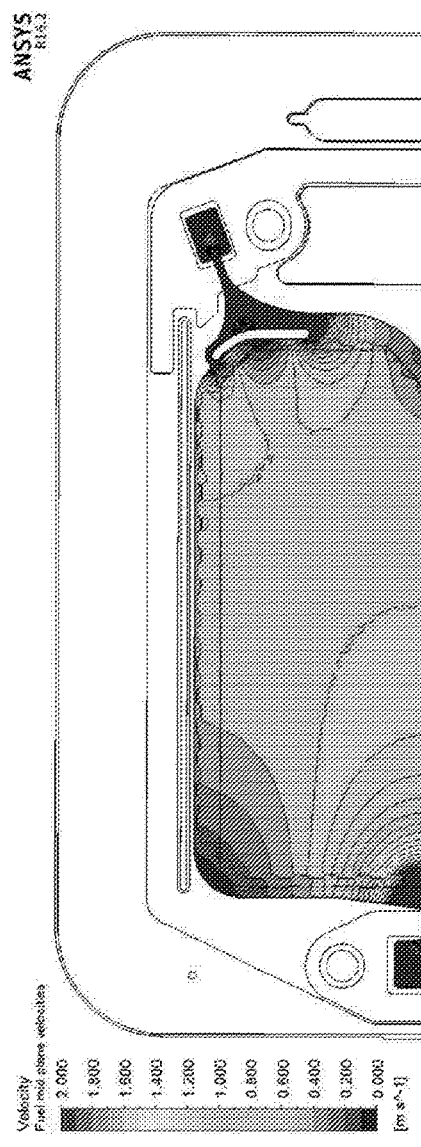

FIG. 15 shows an exploded perspective view of a fuel cell unit of Embodiment 1 with an illustration of fuel flow FIG. 16A is a CFD image showing fuel velocity in a prior art device FIG. 16B is a CFD image showing fuel velocity in a prior art device (shading indicates fuel mid plane velocities in m·s^-1)

Figure 16C:
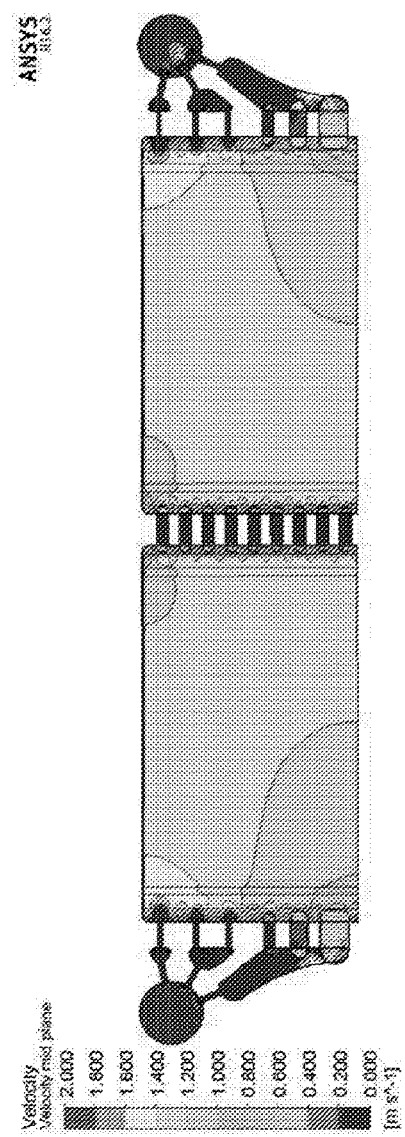

FIG. 16C is a CFD image showing fuel velocity in a device according to the present invention (shading indicates fuel mid plane velocities in m·s^-1)

Figure 17A:
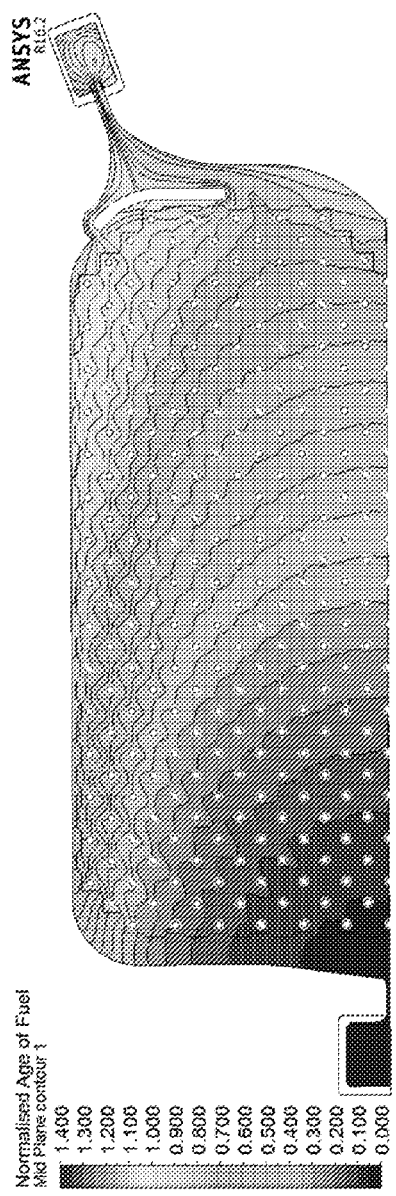
Figure 17B:
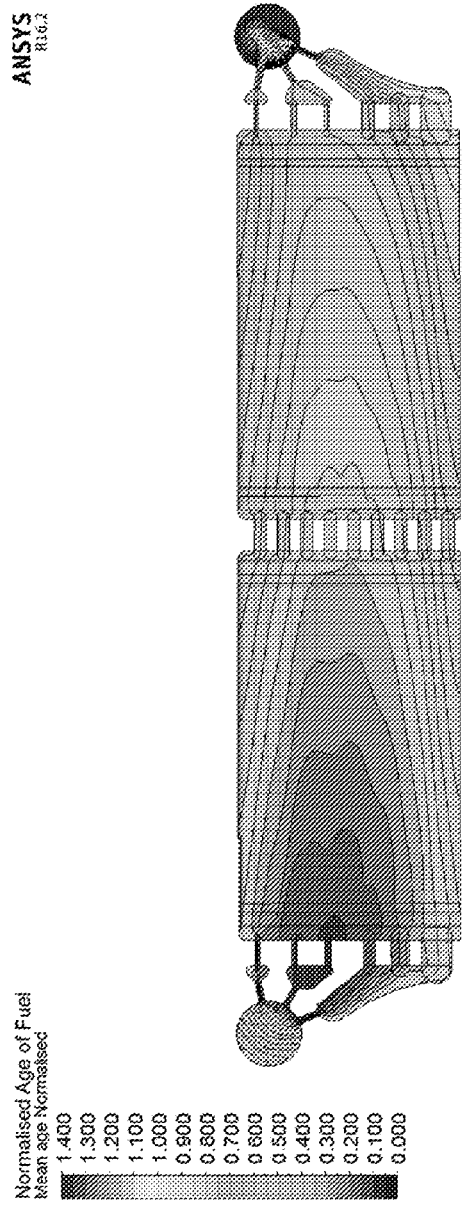

FIG. 17A is a CFD image showing normalised fuel residence time (age of fuel) in a prior art device FIG. 17B is a CFD image showing normalised fuel residence time (age of fuel) in a device according to the present invention A list of the reference signs used herein is given at the end of the specific embodiments. Repeat use of reference symbols in the present specification and drawings is intended to represent the same or analogous features or elements.

It will be apparent to those of ordinary skill in the art that various modifications and variations can be made in the present invention without departing from the scope of the appended claims. For instance, features described as part of one embodiment can be used on another embodiment to yield a still further embodiment. Thus, it is intended that the present invention cover such modifications and variations as come within the scope of the appended claims and their equivalents.

Other objects, features, and aspects of the present invention are disclosed in the remainder of the specification. It is to be understood by one of ordinary skill in the art that the present discussion is a description of exemplary embodiments only and is not intended as limiting the broader aspects of the present invention, which broader aspects are embodied in the exemplary constructions.

EMBODIMENT 1

Fabrication of a metal supported solid oxide fuel cell unit 1 is illustrated in the Figures. Metal supported solid oxide fuel cell unit 1 is for use as a solid oxide fuel cell stack layer.

In this embodiment, metal supported solid oxide fuel cell unit 1 is fabricated comprising a metal substrate 65 (also referred to as a "substrate layer" or a "metal substrate layer"), a metal spacer 30, and a metal interconnect plate 20.

Metal substrate plates 70a and 70b each comprise a porous region 78 defined by laser-drilled perforations 78a extending between first surface 71 and second surface 72. Fuel cell 79 is deposited over porous region 78 on second surface 72 of metal substrate plates 70a and 70b, and comprises an anode layer deposited over (bonded to) porous region 78 of metal substrate plate 70a, 70b, an electrolyte layer deposited over (bonded to) the anode layer, and a cathode layer deposited over the electrolyte layer. Porous region 78 is surrounded by non-porous region 78b.

Figure 1:
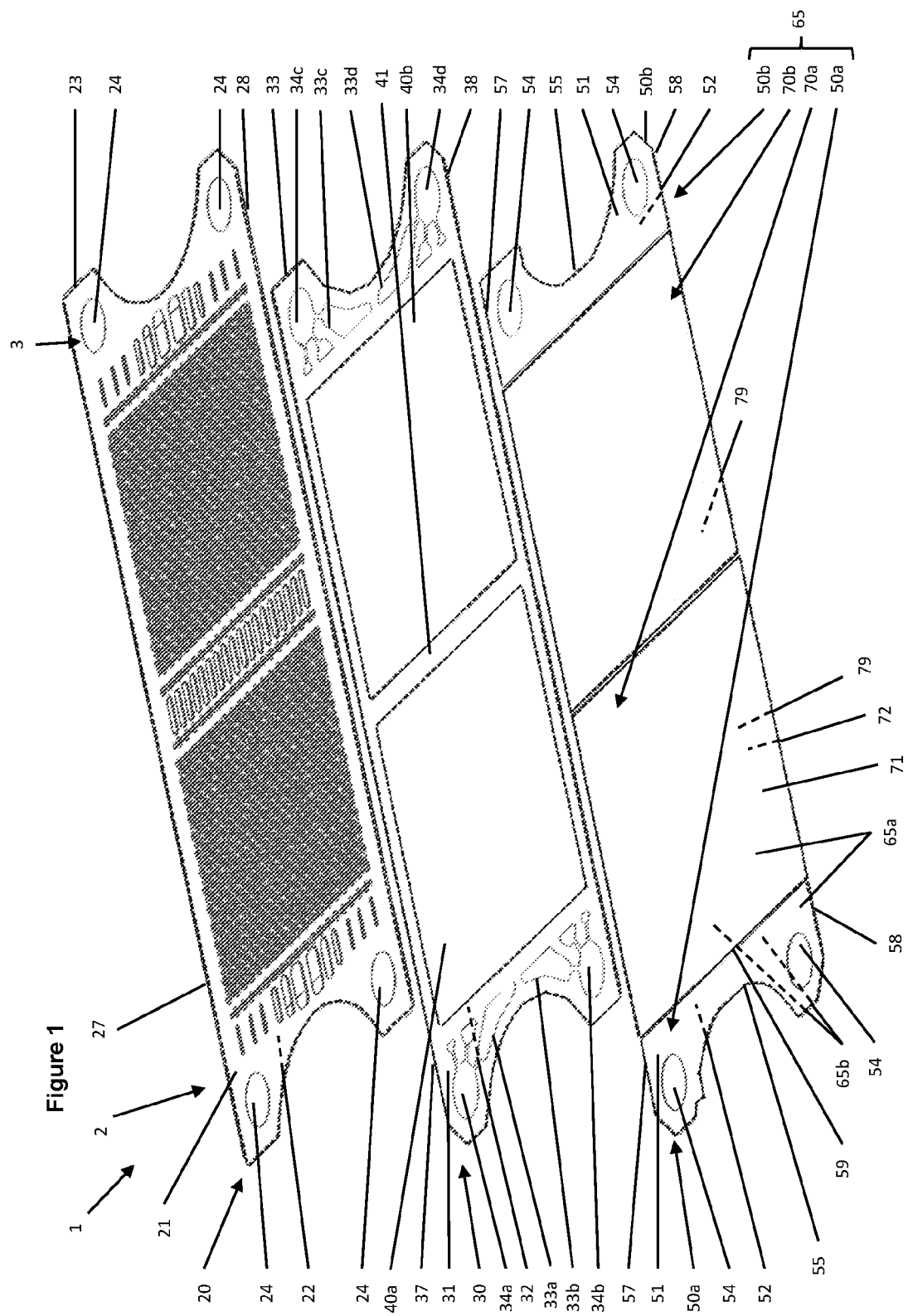
FIG. 1 shows an exploded perspective view of the fuel cell unit components of Embodiment 1
Figure 2:
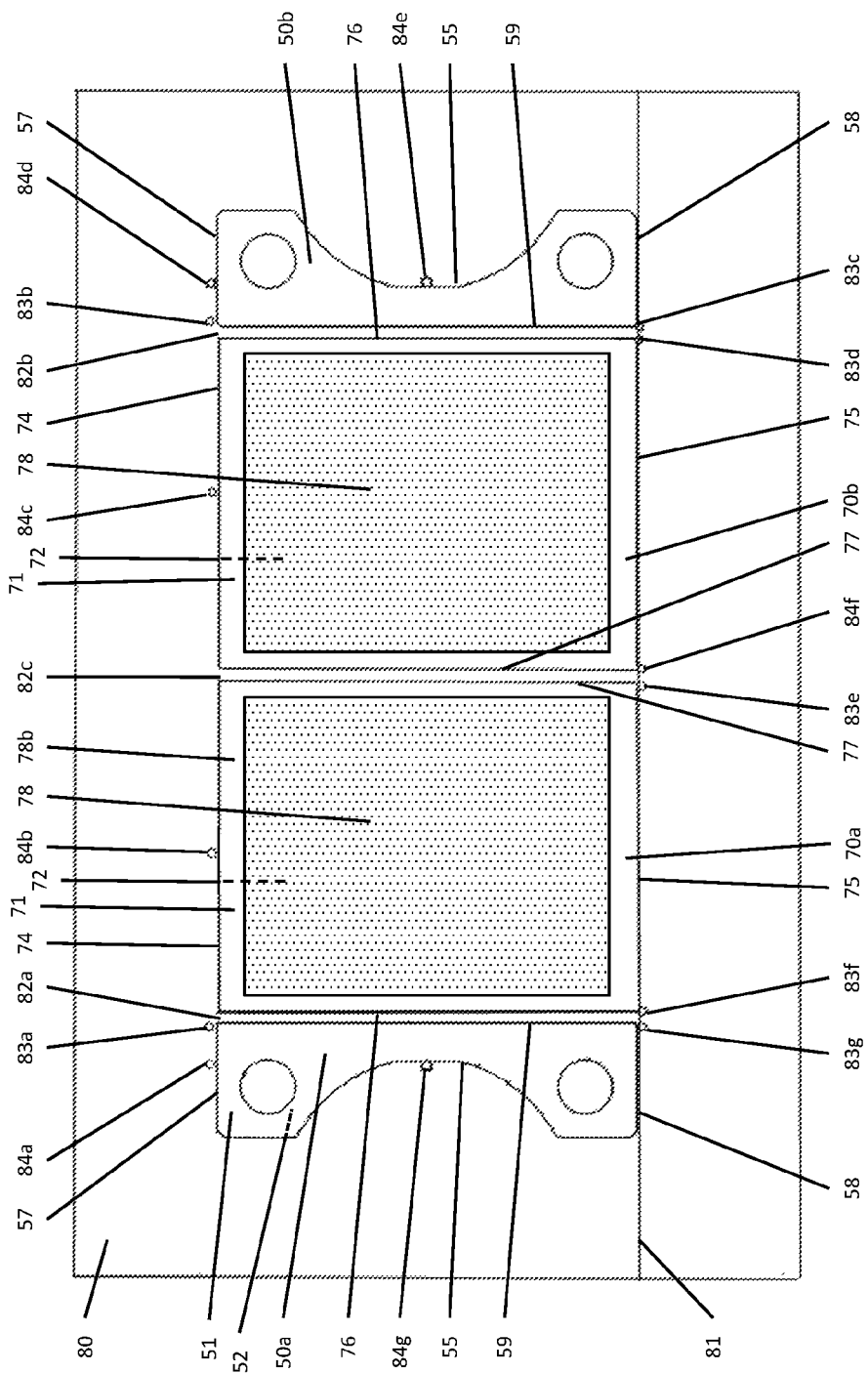
FIG. 2 shows a top view of metal substrate components located on an assembly baseplate

As shown in FIG. 2, assembly baseplate 80 comprises fixed dowels 83a, 83b, 83c, 83d, 83e, 83f, 83g, and spring loaded dowels 84a, 84b, 84c, 84d, 84e, 84f, 84g. Assembly baseplate 80 also defines (comprises) a datum edge 81.

Metal substrate plates 70a and 70b, and blanking plates 50a and 50b are aligned on assembly baseplate 80, and alignment is achieved by fixed dowels 83a, 83b, 83c, 83d, 83e, 83f, 83g, spring loaded dowels 84a, 84b, 84c, 84d, 84e, 84f, 84g, and datum edge 81.

Second surface 52 of blanking plate 50a is disposed on (i.e. contacts/abuts) assembly baseplate 80. Second edge 58 of blanking plate 50a is aligned on datum edge 81 by fixed dowel 83g, and first edge 57 of blanking plate 50a is aligned to fixed dowel 83a and spring loaded dowel 84a. Curved edge 55 of blanking plate 50a is aligned by spring loaded dowel 84g.

Second surface 52 of blanking plate 50b is disposed on (i.e. contacts/abuts) assembly baseplate 80. Second edge 58 of blanking plate 50b is aligned on the datum edge 81 by fixed dowel 83c, and first edge 57 of blanking plate 50b is aligned to fixed dowel 83b and spring loaded dowel 84d. Curved edge 55 of blanking plate 50b is aligned with spring loaded dowel 84e.

Second surface 72 of metal substrate plate 70a is disposed on (i.e. contacts/abuts) assembly baseplate 80.

Metal substrate plates 70a and 70b are positioned on assembly baseplate 80 between blanking plates 50a and 50b. Second short side 75 of metal substrate plate 70a is aligned on datum edge 81 by fixed dowels 83f and 83e. First short side 74 of metal substrate plate 70a is aligned by spring loaded dowel 84b.

Second short side 75 of metal substrate plate 70b is aligned on datum edge 81 by fixed dowel 83d and spring loaded dowel 84f. First short side 74 of metal substrate plate 70b is aligned by spring loaded dowel 84c.

Outer long side 76 of metal substrate plate 70a is aligned parallel to inner edge 59 of the blanking plate 50a, defining a tolerance gap 82a between metal substrate plate 70a and blanking plate 50a.

Outer long side 76 of metal substrate plate 70b is aligned parallel to inner edge 59 of blanking plate 50b, defining a tolerance gap 82b between metal substrate plate 70b and blanking plate 50b.

Tolerance gap 82c is defined between inner long side 77 of metal substrate plate 70a and inner long side 77 of metal substrate plate 70b.

Figure 3:
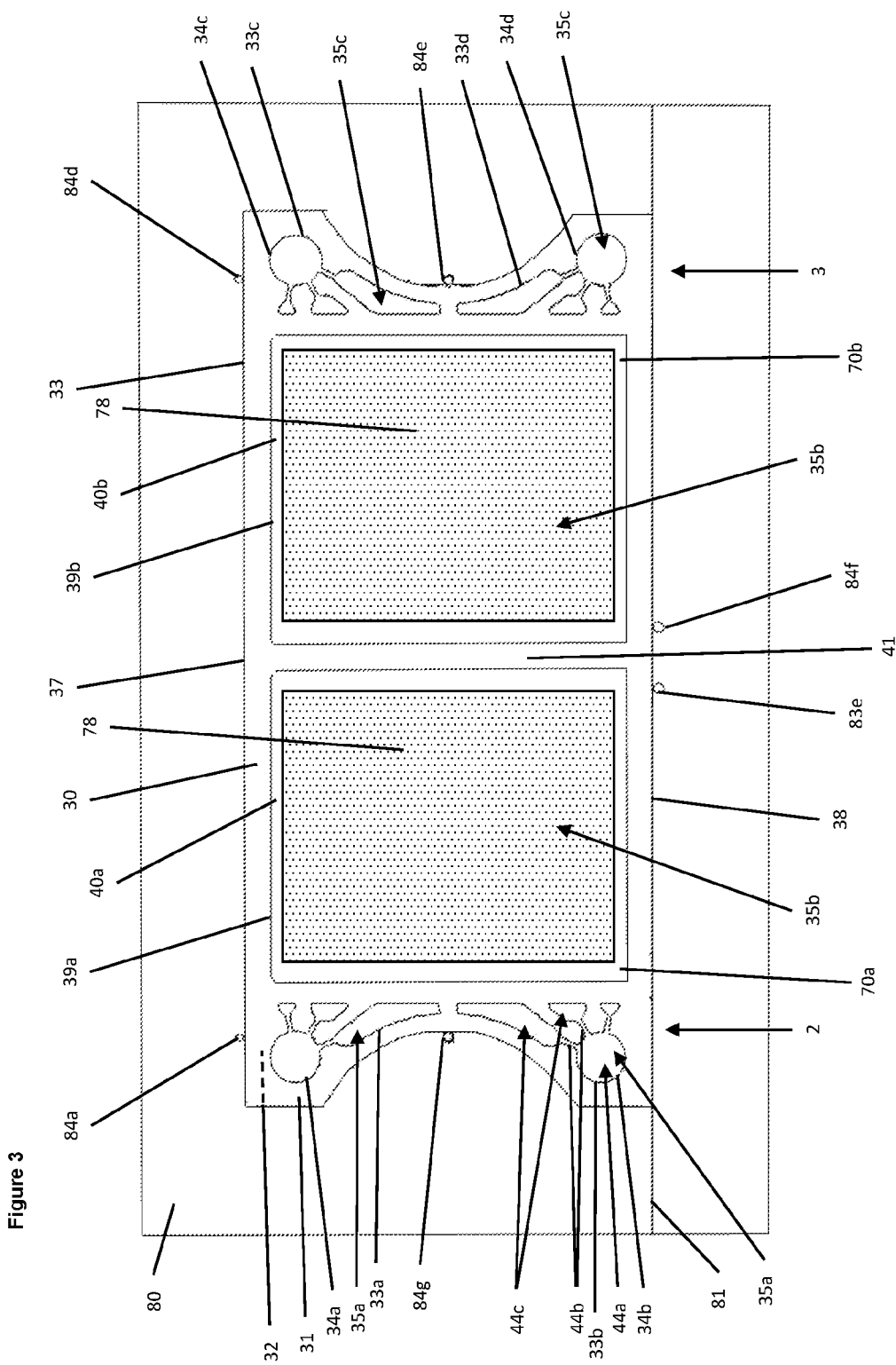
FIG. 3 shows a top view of a metal spacer positioned on top of metal substrate components of FIG. 2

As shown in FIG. 3, metal spacer 30 is then placed on top of blanking plate 50a, metal substrate plate 70a, metal substrate plate 70b and blanking plate 50b.

Second surface 32 of metal spacer 30 is disposed on (i.e. contacts/abuts) first surface 51 of blanking plate 50a, first surface 71 of metal substrate plate 70a, first surface 71 of metal substrate plate 70b, and first surface 51 of blanking plate 50b.

Metal spacer 30 is aligned with blanking plate 50a, metal substrate plate 70a, metal substrate plate 70b and blanking plate 50b by fixed dowel 83e, spring loaded dowels 84a, 84d, 84e, 84f and 84g, and datum edge 81.

Second elongate edge 38 of metal spacer 30 is aligned with datum edge 81 and second edge 58 of blanking plates 50a and 50b and second short sides 75 of metal substrate plates 70a and 70b using fixed dowel 83e and spring loaded dowel 84f. First elongate edge 37 of metal spacer 30 is aligned with first edges 57 of blanking plates 50a and 50b and first short sides 74 of metal substrate plates 70a and 70b using spring loaded dowels 84a and 84d.

The external perimeters of blanking plate 50a, metal substrate plate 70a, metal substrate plate 70b and blanking plate 50b do not extend beyond external perimeter 33 of metal spacer 30.

Metal spacer 30 comprises cut-out internal perimeters 39a and 39b, with each internal perimeter defining a respective cut-out 40a and 40b, and a cross member 41 between them. Metal substrate plates 70a and 70b wholly overlap cut-out internal perimeters 39a and 39b of metal spacer 30, i.e. metal substrate plates 70a and 70b wholly cover cut-outs 40a and 40b.

Metal spacer 30 also comprises a plurality of fuel inlet internal perimeters 33a, 33b, and fuel outlet internal perimeters 33c, 33d defining fuel ports 34a, 34b, 34c and 34d.

Each fuel port comprises a number of regions—fuel duct region 44a, fuel throat region 44b, and fuel distributor channel region 44c.

Figure 4:
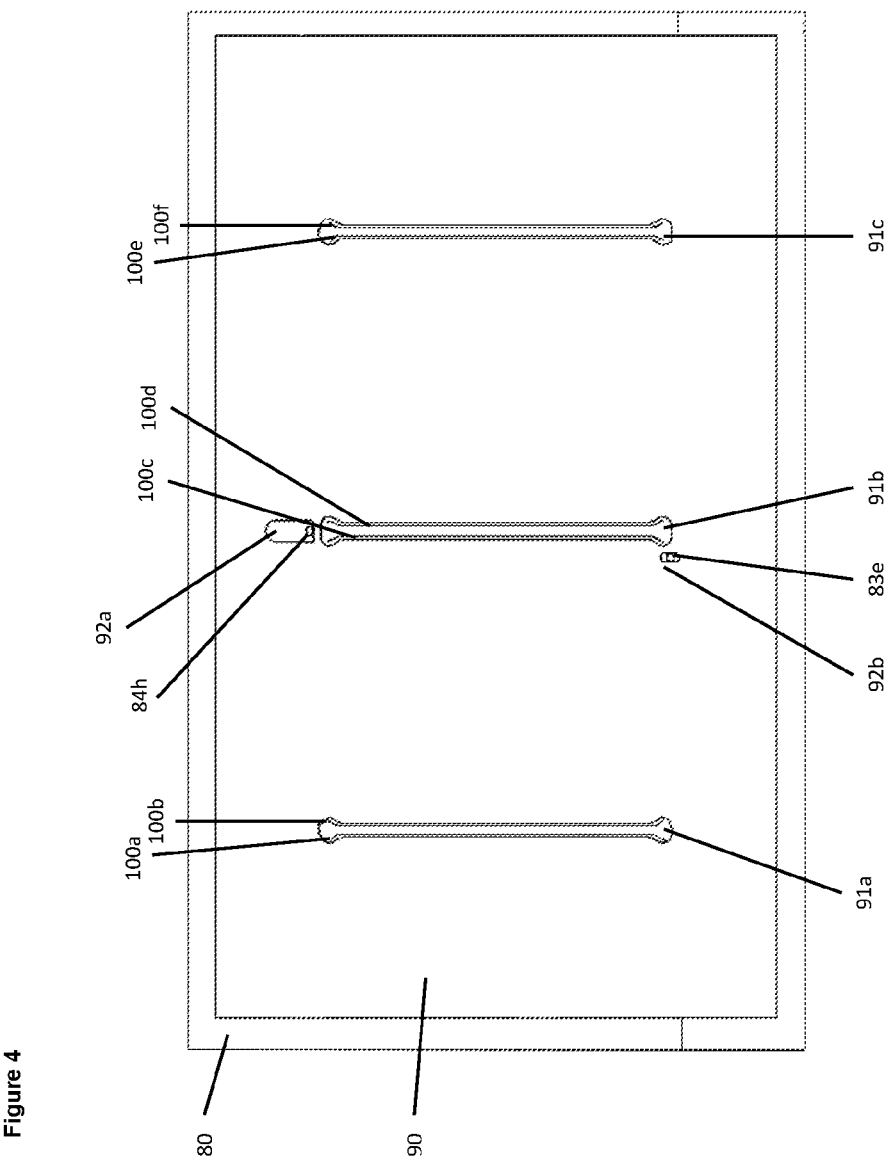
FIG. 4 shows a top view of a first clamping plate positioned on top of the metal spacer of FIG. 3 for welding purposes

As shown in FIG. 4, first clamping plate 90 is then placed on top of metal spacer 30, i.e. contacts/abuts first surface 31 of metal spacer 30.

First clamping plate 90 defines orifices 92a and 92b. Spring loaded dowel 84h projects through orifice 92a, and fixed dowel 83e projects through orifice 92b, allowing first clamping plate 90 to be aligned with metal spacer 30 (and therefore also with blanking plate 50a, metal substrate plate 70a, metal substrate plate 70b and blanking plate 50b).

Clamping means (not shown) clamps first clamping plate 90 and assembly baseplate 80, i.e. clamps metal spacer 30, blanking plate 50a, metal substrate plate 70a, metal substrate plate 70b and blanking plate 50b.

First clamping plate also defines welding slots 91a, 91b and 91c.

Welding means (not shown) is used to create line weld seam 100a between metal spacer 30 and blanking plate 50a, line weld seams 100b and 100c between metal spacer 30 and metal substrate plate 70a, line weld seams 100d and 100e between metal spacer 30 and metal substrate plate 70b, and line weld seam 100f between metal spacer 30 and blanking plate 50b.

Non-porous region 78b of metal substrate plates 70a, 70b is attached to metal spacer 30.

Blanking plate 50a, metal substrate plate 70a, metal substrate plate 70b, and blanking plate 50b attached to metal spacer 30 form/define a metal substrate 65, i.e. a metal substrate 65 attached to metal spacer 30.

Figure 5:
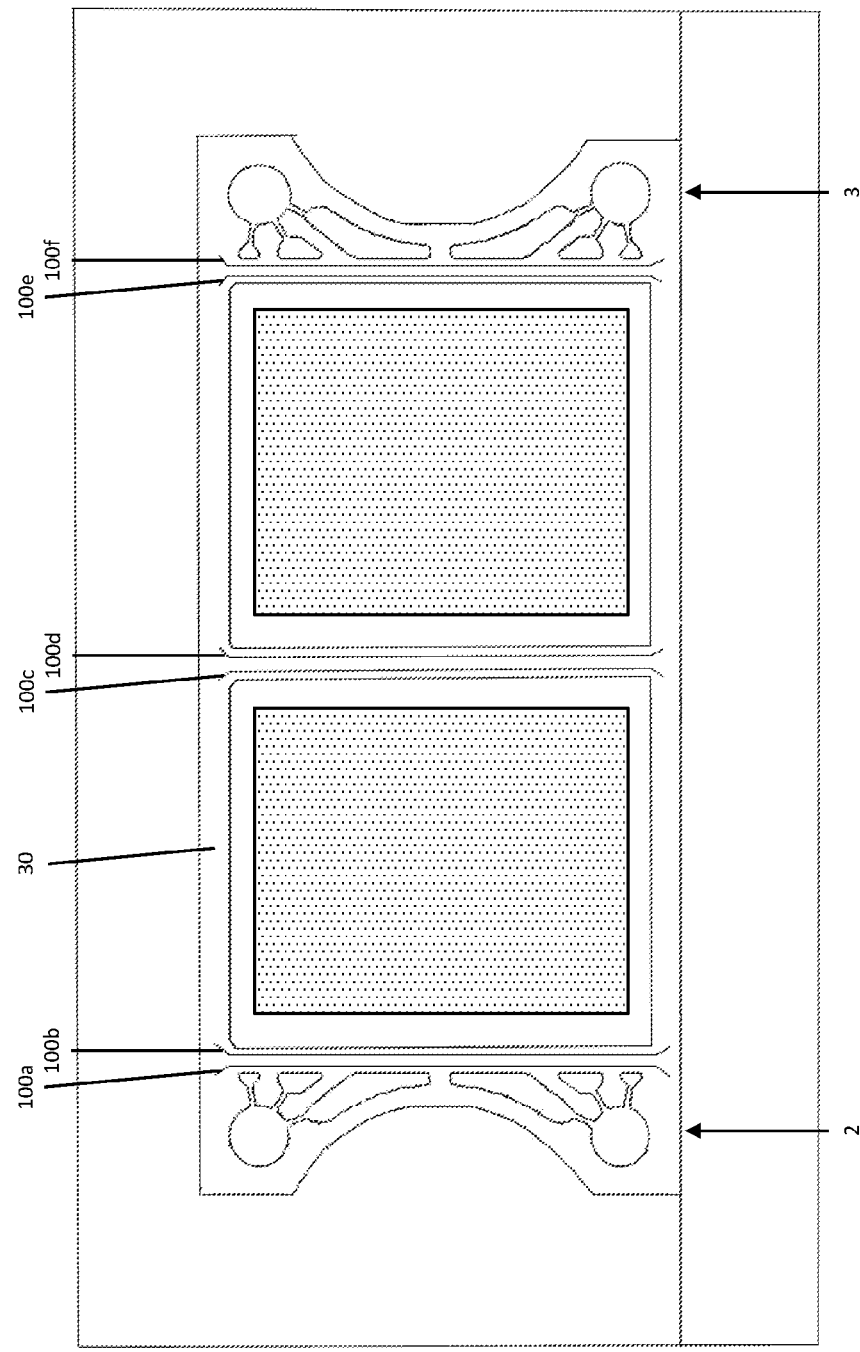
FIG. 5 shows a top view of the metal spacer of FIG. 3 after welding and removal of the first clamping means

First clamping plate 90 is then removed, as shown in FIG. 5 (fixed dowel 83e and spring loaded dowels 84a, 84d and 84f are not shown).

As shown in FIG. 6, metal interconnect plate 20 is then placed on top of metal spacer 30.

Second surface 22 of metal interconnect plate 20 is disposed on (i.e. contacts/abuts) first surface 31 of metal spacer 30.

Metal interconnect plate 20 is aligned with metal spacer 30 (and therefore also blanking plate 50a, metal substrate plate 70a, metal substrate plate 70b and blanking plate 50b) by fixed dowel 83e, spring loaded dowels 84a, 84d, and 84f, and datum edge 81. Spring loaded dowels 84a and 84d abut first edge 27 of metal interconnect plate 20. Second edge 28 of metal interconnect plate 20 abuts datum edge 81, fixed dowel 83e, and spring loaded dowel 84f.

Metal interconnect plate 20 comprises a plurality of dimples 110 and elongate bridge dimples 120, 121 which extend outwardly from first surface 21, i.e. away from second surface 22 and away from metal spacer 30 and the metal substrate 65 attached to metal spacer 30.

Dimples 110 are formed in a number of regions including regions corresponding to the location of fuel cells 79 of metal substrate plates 70a, 70b, such that in a fuel cell stack arrangement comprising a plurality of fuel cell units 1 in a stack, the dimples 110 of a first fuel cell unit 1 contact the fuel cells 79 of an adjacent fuel cell unit 1 with which it is stacked. Thus, the dimples 110 form an electrical connection with the outer (cathode) surface of the fuel cells 79, with electrical current flowing from the first surface 21 of metal interconnect plate 20 to the cathode layer of the adjacent fuel cell/fuel cells 79 of the adjacent fuel cell unit 1.

As described in more detail later, elongate bridge dimples 120, 121 act as fluid flow bridges between separate zones/areas/volumes of the final fuel cell unit 1.

As shown in FIG. 7, second clamping plate 95 is then placed on top of metal interconnect plate 20, i.e. contacts/abuts first surface 21 of metal interconnect plate 20.

Second clamping plate 95 defines orifices 98a and 98b. Spring loaded dowel 84h projects through orifice 98a, and fixed dowel 83e projects through orifice 98b, allowing second clamping plate 95 to be aligned with metal interconnect plate 20 (and therefore also with metal spacer 30, blanking plate 50a, metal substrate plate 70a, metal substrate plate 70b and blanking plate 50b).

Second clamping plate 95 comprises inner perimeter 96 which defines opening 96a.

Clamping means (not shown) clamps second clamping plate 95 and assembly baseplate 80, i.e. clamps metal interconnect plate 20, metal spacer 30, blanking plate 50a, metal substrate plate 70a, metal substrate plate 70b and blanking plate 50b.

Welding means (not shown) is used to create a continuous perimeter weld seam 101 between metal interconnect plate 20, metal spacer 30, and blanking plate 50a, metal substrate plate 70a, metal substrate plate 70b, and blanking plate 50b.

Second clamping plate 95 is then removed, and the completed metal supported solid oxide fuel cell unit 1 is removed from assembly base plate 80.

In the completed metal supported solid oxide fuel cell unit 1, fuel ducts 130 are defined by fuel ports 24, fuel duct regions 44a of fuel ports 34a-d, all of which are aligned with one another. Fuel ducts 130 extend between first surface 21 of metal interconnect plate 20 and second surface 52 of blanking plates 50a, 50b.

At first end 2 of fuel cell unit 1 (see e.g. FIG. 3), first volumes (fuel inlet port volumes 35a) are defined between first surface 51 of blanking plate 50a, fuel inlet internal perimeters 33a, 33b of metal spacer 30, and second surface 22 of metal interconnect plate 20.

A second volume (a cut-out volume 35b) is defined between first surface 71 of metal substrate plate 70a, cut-out internal perimeter 39a of metal spacer 30, and second surface 22 of metal interconnect plate 20.

A third volume (a cut-out volume 35b) is defined between first surface 71 of metal substrate plate 70b, cut-out internal perimeter 39b of metal spacer 30, and second surface 22 of metal interconnect plate 20.

At second end 3 of fuel cell unit 1, fourth volumes (fuel outlet port volumes 35c) are defined between first surface 51 of blanking plate 50b, fuel outlet internal perimeters 33c and 33d of metal spacer 30, and second surface 22 of metal interconnect plate 20.

At first end 2 of fuel cell unit 1, elongate dimples 120 act to define a fluid flow passage between the first and second volumes, i.e. act as fluid flow bridges between the first and second volumes. The fluid flow bridges are the volumes between the elongate dimples 120 and the metal spacer 30.

Elongate dimples 121 act to define a fluid flow passage between the second and third volumes (i.e. between the adjacent cut-out volumes 35b). The fluid flow bridges are the volumes between the elongate dimples 121 and the metal spacer 30.

At second end 3 of fuel cell unit 1, elongate dimples 120 act to define a fluid flow passage between the third and fourth volumes, i.e. act as fluid flow bridges between the first and second volumes. The fluid flow bridges are the volumes between the elongate dimples 120 and the metal spacer 30.

Thus, a fluid flow path is defined (using the fuel inlet port volumes 35a, cut-out volumes 35b, fuel outlet port volumes 35c, and fluid flow bridges) from:
(1) fuel duct regions 44a of fuel ports 34a, 34b, to
(2) fuel throat regions 44b of fuel ports 34a, 34b, to
(3) fuel distributor channel regions 44c of fuel ports 34a, 34b, to (4) elongate dimples 120 at first end 2 of fuel cell unit 1, to
(5) the second volume defined between first surface 71 of metal substrate plate 70a, cut-out internal perimeter 39a of metal spacer 30, and second surface 22 of metal interconnect plate 20, to
(6) elongate dimples 121, to
(7) the third volume defined between first surface 71 of metal substrate plate 70b, cut-out internal perimeter 39b of metal spacer 30, and second surface 22 of metal interconnect plate 20, to
(8) fuel distributor channel regions 44c of fuel ports 34c, 34d, to
(9) fuel throat regions 44b of fuel ports 34c, 34d, to
(10) fuel duct regions 44a of fuel ports 34c, 34d.

Thus, a fluid flow path 140 (i.e. a fuel flow path) is defined within fuel cell unit 1 from fuel ducts 130 at first end 2 to fuel ducts 130 at second end 3.

The fluid flow path 140 is illustrated in FIG. 15.

As can be seen from FIGS. 13 and 14, metal interconnect plate 20 comprises one elongate bridge dimple 120a which transfer the fuel from one fuel distributor channel 44c1 to the cut out 40a. Likewise, metal interconnect plate 20 comprises two elongate bridge dimples 120b which transfer the fuel from one fuel distributor channel 44c2 to the cut out 40a. Furthermore, metal interconnect plate 20 comprises three elongate bridge dimples 120c which transfer the fuel from one fuel distributor channel 44c3 to the cut out 40a.

The width of the elongate bridge dimples ra, rb and rb1 remain constant. However, the width rc, rc1 and rc2 of the elongate bridge dimple (the length of the shortest side of the rectangular cross section shape of elongate bridge dimples 120c) increases as the elongate bridge dimples 120c get close to the centre of the fuel cell unit. That is to say, rc2>rc1>rc, so that the flow area enclosed inside the elongate bridge dimples 120c closer to the middle of the fuel cell is gradually greater, being the fuel promoted uniformly to the centre of the fuel cell avoiding fuel starvation in said centre of the fuel cell.

FIG. 14 also illustrates the alternating dimples 110 and 122, with dimples alternating between extending away from the first surface and from the second surface of the metal interconnect plate. For the avoidance of doubt, elongate dimples 120, 120a, 120b, 120c and 121 do not alternate and instead all extend from first surface 21 of metal interconnect plate 20, away from second surface 22.

FIG. 13 illustrates the arrangement of the fuel ports 34a, 34b, 34c and 34d of the metal spacer 30. The fuel throat region 44b comprises a constant width "W" between the fuel port 34a to the corresponding fuel distributor channel region 44c (fuel distributor channel regions 44c1, 44c2, 44c3) wherein the fuel is transferred at high speed from such fuel ports 34a to the corresponding fuel distributor channel region, reducing the risk of fuel starvation.

In addition, fuel distributor channel region 44c (44c1, 44c2, 44c3) comprises a curved shape being the width of said fuel distributor channel region 44c gradually increasing, starting from the width "W" of fuel throat region 44b and finishing at a width equal to a distance (da, db, dc), wherein (da<db<dc).

The distance d (da, db, dc) at the edge of the fuel distributor channel region 44c is longer in the areas close to the centre of the fuel cell unit 1 to promote the fuel uniformly along the middle region of the fuel cell unit 1, improving the fuel distribution.

In a fuel cell stack assembly, the length "L" of the fuel throat region 44b is related to the size of the compression gaskets located in between the metal interconnect plate 20 of one solid oxide fuel cell unit 1 and the substrate layer 65 of the following solid oxide fuel cell unit 1, the gasket comprising a toroid shape surrounding one port of interconnect. The length "L" of the fuel throat region 44b is coincident with the external radius minus the internal radius of the compression gasket to minimize pressure drop.

Additional dimples 122 are located in between dimples 110 and elongate bridge dimples 120, alongside such side elongate bridge dimples 120. In addition, additional dimples 122 are located in between dimples 110 and elongate bridge dimples 121. Dimples 122 maintain clearance between the interconnect 20 and the metal substrate 65 avoiding fuel blockage in such areas where the additional dimples 122 are located.

Elongate bridge dimples 120c comprise a wedge shape along its shortest side of its rectangular cross-sectional shape, such wedge shape located on the side connecting the fuel distribution channel region 44c3 to the elongate bridge dimples 120c. In a fuel cell stack assembly, the wedge shape maintains clearance between the metal interconnect plate 20 and the next fuel cell unit 1, reducing the risk of short circuits between two adjacent solid oxide fuel cell units 1.

FIGS. 16A, 16B and 16C show the significant improvement in fuel velocity achieved with the present invention (FIG. 16C) as compared to prior art devices. In particular, there is a significant increase in fuel velocity around port areas. The fuel velocity remains more constant with the present invention (FIG. 16C), with less fuel deficiency regions at the corner of the fuel cell unit 1, and the fuel promoted uniformly across the fuel cell unit 1, which improve the chemical reaction occurring within the fuel cell.

FIGS. 17A and 17B and Table 1 show that in the present invention the normalised fuel residence time has decreased as compared to the prior art, which means less concentration of Hydrogen is required for the chemical reaction. That is to say, less fuel is needed for the chemical reaction to occur, so the efficiency of the present invention is improved as compared to the prior art.

TABLE 1

|  | Maximum | Average at Active region exit | Average in active region |
| --- | --- | --- | --- |
| Prior art | 1.1 | 0.88 | 0.72 |
| Embodiment 1 | 0.78 | 0.62 | 0.29 |

Table 2 illustrates flow uniformity at the fuel cell unit 1 active area—a higher coefficient shows a better flow distribution across the active region, so the fuel is better distributed across the cell in the present application.

TABLE 2

|  | Entry | Exit |
| --- | --- | --- |
| Prior art | 0.56 | 0.51 |
| Present invention | 0.81 | 0.81 |

Table 3 illustrates pressure drop at operating point. Due to a better distribution of the fuel, the pressure drop between inlet and outlet ports has decreased in the present invention as compared to the prior art. Minimizing the pressure drop across the cell is beneficial to maintain the compression along the stack.

TABLE 3

| | Pressure drop |
|---|---|
| Prior art | 58.17 mbar |
| Present invention | 49.8 mbar |

Suitable material for various components include (Table 4):

TABLE 4

| | |
|---|---|
| metal interconnect plate 20 | ferritic stainless steel, grade 441 |
| metal spacer 30 | ferritic stainless steel, grade 441 |
| blanking plates 50a, 50b | Crofer 22 APU (VDM Metals GmbH) |
| metal substrate plates 70a, 70b | Crofer 22 APU (VDM Metals GmbH) |

EMBODIMENT 2

As shown in FIG. 10, Embodiment 2 is as per Embodiment 1, except that in metal supported solid oxide fuel cell unit 1:

(i) blanking plate 50*a* and metal substrate plate 70*a* are formed as a combined metal substrate plate 170*a*, and (ii) blanking plate 50*b* and metal substrate plate 70*b* are formed as a combined metal substrate plate 170*b*.

Fabrication and operation is otherwise identical to that of Embodiment 1.

EMBODIMENT 3

As per WO2015/136295, a fuel cell stack assembly is formed using a plurality of fuel cell units 1. In more detail, a stack of fuel cell units 1 is assembled on top of a metal base plate (ferritic stainless steel 3CR12), with a Thermiculite 866 gasket electrically insulating the base plate from the adjacent fuel cell unit 1, and a power take off located between the Thermiculite 866 gasket and the adjacent fuel cell unit 1. Thermiculite 866 gaskets are located between the first ends 2 of adjacent fuel cell units 1, and between the second end 3 of adjacent fuel cell units. A power take-off is then positioned upon the top (i.e. the exposed) fuel cell unit 1, a Thermiculite 866 gasket is then placed on top of the power take-off and a metal end plate (ferritic stainless steel 3CR12) placed upon the Thermiculite gasket. Compressive force is then exerted by compression means between the base plate and the end plate, and a skirt attached to the base plate and the end plate to define a volume between them within which is contained the fuel cell stack and its fuel cell units.

EMBODIMENT 4

As shown in FIG. 11, Embodiment 4 is as per Embodiment 1, except that in solid oxide fuel cell unit 1:

(i) blanking plate 50*a*, metal substrate plate 70*a*, metal substrate plate 70*b* and blanking plate 50*b* are formed as a single combined metal substrate plate 180 (a metal substrate)

(ii) metal spacer 30 has a single cut-out internal perimeter 39*a* defining a single cut-out.

Fabrication and operation is otherwise identical to that of Embodiment 1.

EMBODIMENT 5

As shown in FIG. 12, a fuel cell unit 1 is fabricated as per Embodiment 1. In this embodiment, there are a total of six metal substrate plates 70, and six corresponding cut-outs 40.

EMBODIMENT 6

This embodiment is as per Embodiment 4, except that metal substrate plate 180 comprises a single porous region 78, and a single fuel cell 79 is provided on the second surface 72 of metal substrate plate 180, the porous region and the fuel cell extending to the perimeter of the single cut-out internal perimeter 39*a*.

When manufacturing the fuel cell unit 1, the first welding step (in which the metal substrate 65/70 components are welded to the metal spacer 30) is not necessary. Instead, a single welding around the perimeter through the three layers is performed.

Various modifications, adaptations and alternative embodiments will be readily apparent to the person of ordinary skill in the art without departing from the scope of the appended claims. Reference signs are incorporated in the claims solely to ease their understanding, and do not limit the scope of the claims.

REFERENCE SIGNS

1 Solid oxide fuel cell unit
2 First end
3 Second end
20 Metal interconnect plate
21 First surface (of metal interconnect plate 20)
22 Second surface (of metal interconnect plate 20)
23 External perimeter (of metal interconnect plate 20)
24 Fuel port (of metal interconnect plate 20)
27 First edge (of metal interconnect plate 20)
28 Second edge (of metal interconnect plate 20)
30 Metal spacer
31 First surface (of metal spacer 30)
32 Second surface (of metal spacer 30)
33 External perimeter (of metal spacer 30)
33*a* Fuel inlet internal perimeter
33*b* Fuel inlet internal perimeter
33*c* Fuel outlet internal perimeter
33*d* Fuel outlet internal perimeter
34*a* Fuel port
34*b* Fuel port
34*c* Fuel port
34*d* Fuel port
35*a* Fuel inlet port volume
35*b* Cut-out volume
35*c* Fuel outlet port volume
37 First elongate edge (of metal spacer 30)
38 Second elongate edge (of metal spacer 30)
39*a* Cut-out internal perimeter
39*b* Cut-out internal perimeter
40 Cut-out
40*a* Cut-out
40*b* Cut-out
41 Cross member
44*a* Fuel duct region
44*a*1 Fuel duct region
44*a*2 Fuel duct region
44*a*3 Fuel duct region
44*b* Fuel throat region
44*c* Fuel distributor channel region 44c1 Fuel distributor channel region
44c2 Fuel distributor channel region
44c3 Fuel distributor channel region
50a Blanking plate
50b Blanking plate
51 First surface (of blanking plate)
52 Second surface (of blanking plate)
54 Fuel port (of blanking plate)
55 Curved edge (of blanking plate)
57 First edge (of blanking plate)
58 Second edge (of blanking plate)
59 Inner edge (of blanking plate)
65 Metal substrate
65a Metal substrate first surface
65b Metal substrate second surface
70 Metal substrate
70a Metal substrate plate
70b Metal substrate plate
71 First surface (of metal substrate plate)
72 Second surface (of metal substrate plate)
74 First short side (of metal substrate plate)
75 Second short side (of metal substrate plate)
76 Outer long side (of metal substrate plate)
77 Inner long side (of metal substrate plate)
78 Porous region (of metal substrate plate)
78a Perforation
78b Non-porous region (of metal substrate plate)
79 Solid oxide fuel cell
80 Assembly baseplate
81 Datum edge
82a Tolerance gap
82b Tolerance gap
82c Tolerance gap
83a Fixed dowel
83b Fixed dowel
83c Fixed dowel
83d Fixed dowel
83e Fixed dowel
83f Fixed dowel
83g fixed dowel
84a Spring loaded dowel
84b Spring loaded dowel
84c Spring loaded dowel
84d Spring loaded dowel
84e Spring loaded dowel
84f Spring loaded dowel
84g Spring loaded dowel
84h Spring loaded dowel
90 First clamping plate
91a Welding slot
91b Welding slot
91c Welding slot
92a Orifice
92b Orifice
95 Second clamping plate
96 Inner perimeter
96a Opening
98a Orifice
98b Orifice
100a Line weld seam
100b Line weld seam
100c Line weld seam
100d Line weld seam
100e Line weld seam
100f Line weld seam
101 Perimeter weld seam
110 Dimple
120 Elongate bridge dimple
120a Elongate bridge dimple
120b Elongate bridge dimple
120c Elongate bridge dimple
121 Elongate bridge dimple
122 Dimple
130 Fuel duct
140 Fluid flow path
170a Combined metal substrate plate
170b Combined metal substrate plate
180 Combined metal substrate plate
da Distance
db Distance
dc Distance
rc1 Width
rc2 Width
rc3 Width
L Length (of fuel throat region 44b)
W Width (of fuel throat region 44b)

The invention claimed is:

1. A metal supported solid oxide fuel cell unit comprising:
    a) a metal substrate defining first and second opposed surfaces, wherein at least one solid oxide fuel cell is disposed on said second surface of said metal substrate;
    b) a metal spacer, which defines first and second opposed surfaces, said metal spacer comprising:
        (i) an external perimeter,
        (ii) at least one fuel inlet internal perimeter defining a fuel inlet port,
        (iii) at least one cut-out internal perimeter defining a cut-out, and
        (iv) at least one fuel outlet internal perimeter defining a fuel outlet port,
        wherein said first surface of said metal substrate is attached to said second surface of said metal spacer; and
    c) a metal interconnect plate which defines first and second opposed surfaces, said second surface of said metal interconnect plate sealingly attached to said first surface of said metal spacer,
    wherein:
    a fuel inlet port volume is defined between said first surface of said metal substrate,
    each fuel inlet internal perimeter of said metal spacer, and said second surface of said metal interconnect plate,
    a cut-out volume is defined between said first surface of said metal substrate, said at least one cut-out internal perimeter of said metal spacer, and said second surface of said metal interconnect plate, and
    a fuel outlet port volume is defined between said first surface of said metal substrate,
    each fuel outlet internal perimeter of said metal spacer, and said second surface of said metal interconnect plate,
    wherein said metal interconnect plate comprises a plurality of bridge portions defining a fluid flow path from said at least one fuel inlet port volume to said at least one cut-out volume to said at least one fuel outlet port volume.

2. A metal supported solid oxide fuel cell unit according to claim 1, wherein a fluid flow path is defined from the at least one fuel inlet port to the at least one cut-out internal perimeter to the at least one fuel outlet port via the bridge portions.

3. A metal supported solid oxide fuel cell unit according to claim 1, wherein there are a plurality of bridge portions between adjacent volumes.

4. A metal supported solid oxide fuel cell unit according to claim 1, wherein each metal spacer fuel inlet port and each metal spacer fuel outlet port comprises a fuel duct region, a plurality of fuel throat regions, and a corresponding plurality of fuel distributor channel regions.

5. A metal supported solid oxide fuel cell unit according to claim 1, wherein said bridge portions extend outwardly from said first surface of said metal interconnect plate, away from said second surface of said metal interconnect plate.

6. A metal supported solid oxide fuel cell unit according to claim 1, wherein said bridge portions comprise an elongate dimple.

7. A metal supported solid oxide fuel cell unit according to claim 1, wherein said bridge portions define a volume between said first surface of said metal spacer and said second surface of said metal interconnect plate.

8. A metal supported solid oxide fuel cell unit according to claim 1, wherein said metal spacer comprises at least two fuel inlet internal perimeters defining at least two fuel inlet ports.

9. A metal supported solid oxide fuel cell unit according to claim 1, wherein said metal spacer comprises at least two cut-out internal perimeters defining at least two cut-outs.

10. A metal supported solid oxide fuel cell unit according to claim 1, wherein said metal spacer comprises at least two fuel outlet internal perimeters defining at least two fuel outlet ports.

11. A metal supported solid oxide fuel cell unit according to claim 1, wherein said metal supported solid oxide fuel cell unit is a metal supported solid oxide fuel cell stack layer.

12. A solid oxide fuel cell stack comprising a plurality of metal supported solid oxide fuel cell units according to claim 1.

13. A solid oxide fuel cell stack assembly comprising: a base plate, an end plate, a solid oxide fuel cell stack according to claim 12, and a skirt attached to said base plate and said end plate and defining a volume between said skirt, said base plate and said end plate within which is contained said fuel cell stack.

14. A method of assembly of a metal supported solid oxide fuel cell unit, the metal supported solid oxide fuel cell unit comprising:

a) a metal substrate defining first and second opposed surfaces, wherein at least one solid oxide fuel cell is disposed on said second surface of said metal substrate;
b) a metal spacer, which defines first and second opposed surfaces, said metal spacer comprising:
(i) an external perimeter,
(ii) at least one fuel inlet internal perimeter defining a fuel inlet port,
(iii) at least one cut-out internal perimeter defining a cut-out, and
(iv) at least one fuel outlet internal perimeter defining a fuel outlet port; and
c) a metal interconnect plate which defines first and second opposed surfaces,
said method of assembly comprising the steps of:
(i) attaching said first surface of said metal substrate to said second surface of said metal spacer; and
(ii) sealingly attaching said second surface of said metal interconnect plate to said first surface of said metal spacer,
wherein:
a fuel inlet port volume is defined between said first surface of said metal substrate,
each fuel inlet internal perimeter of said metal spacer, and said second surface of said metal interconnect plate,
a cut-out volume is defined between said first surface of said metal substrate, said at least one cut-out internal perimeter of said metal spacer, and said second surface of said metal interconnect plate, and
a fuel outlet port volume is defined between said first surface of said metal substrate,
each fuel outlet internal perimeter of said metal spacer, and said second surface of said metal interconnect plate,
wherein said metal interconnect plate comprises a plurality of bridge portions defining a fluid flow path from said at least one fuel inlet port volume to said at least one cut-out volume to said at least one fuel outlet port volume.

* * * * *